US012783597B2

(12) United States Patent
Zhang et al.

(10) Patent No.: US 12,783,597 B2
(45) Date of Patent: Nov. 3, 2026

(54) COMPUTING APPARATUS AND METHOD FOR VECTOR INNER PRODUCT, AND INTEGRATED CIRCUIT CHIP

(71) Applicant: Anhui Cambricon Information Technology Co., Ltd., Hefei (CN)

(72) Inventors: Yao Zhang, Hefei (CN); Shaoli Liu, Hefei (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 740 days.

(21) Appl. No.: 17/619,795

(22) PCT Filed: Oct. 22, 2020

(86) PCT No.: PCT/CN2020/122951
§ 371 (c)(1),
(2) Date: Dec. 16, 2021

(87) PCT Pub. No.: WO2021/078212
PCT Pub. Date: Apr. 29, 2021

(65) Prior Publication Data

US 2022/0366006 A1 Nov. 17, 2022

(30) Foreign Application Priority Data

Oct. 25, 2019 (CN) ........................ 201911022958.X

(51) Int. Cl.
*G06F 17/16* (2006.01)
*G06F 7/483* (2006.01)
(Continued)

(52) U.S. Cl.
CPC .......... *G06F 17/16* (2013.01); *G06F 7/49915* (2013.01); *G06F 7/5318* (2013.01);
(Continued)

(58) Field of Classification Search
CPC .................................................... G06F 7/5443
(Continued)

(56) References Cited

U.S. PATENT DOCUMENTS 7,225,216 B1 * 5/2007 Wyland ................ G06F 7/5443 708/501
9,465,578 B2 * 10/2016 Tannenbaum ........ G06F 7/4876
(Continued)

FOREIGN PATENT DOCUMENTS

CN 110210615 A 9/2019
CN 110221808 A * 9/2019 .......... G06F 7/5443

OTHER PUBLICATIONS

B. K. Mohanty, "Efficient Fixed-Width Adder-Tree Design," in IEEE Transactions on Circuits and Systems II: Express Briefs, vol. 66, No. 2, pp. 292-296, Feb. 2019, doi: 10.1109/TCSII.2018.2849214. (Year: 2019).*
(Continued)

*Primary Examiner* — James Trujillo
*Assistant Examiner* — Markus Anthony Villanueva
(74) *Attorney, Agent, or Firm* — Getech Law LLC; Jun Ye

(57) ABSTRACT

The present disclosure relates to a computing apparatus, a method and an integrated circuit chip for a vector inner product, where the computing apparatus may be included in a combined processing apparatus. The combined processing apparatus may further include a general interconnection interface and other processing apparatus. The computing apparatus interacts with other processing apparatus to jointly complete a computing operation specified by a user. The combined processing apparatus may further include a storage apparatus, where the storage apparatus is respectively connected to the computing apparatus and other processing
(Continued)

apparatus, and the storage apparatus is used for storing data of the computing apparatus and other processing apparatus.

17 Claims, 14 Drawing Sheets

(51) Int. Cl.
*G06F 7/499* (2006.01)
*G06F 7/53* (2006.01)
*G06F 7/533* (2006.01)
*G06F 7/544* (2006.01)

(52) U.S. Cl.
CPC ............ *G06F 7/533* (2013.01); *G06F 7/5443* (2013.01); *G06F 7/483* (2013.01)

(58) Field of Classification Search
USPC .................................................. 708/514, 607
See application file for complete search history.

(56) References Cited

U.S. PATENT DOCUMENTS

| | | | | |
|---|---|---|---|---|
| 11,188,303 | B2 * | 11/2021 | Nair | G06F 17/16 |
| 12,223,291 | B2 * | 2/2025 | Meng | G06F 7/5443 |
| 2011/0270902 | A1 * | 11/2011 | Dimitrov | G06F 7/483<br>708/204 |
| 2016/0092167 | A1 * | 3/2016 | Rarick | G06F 7/49957<br>708/497 |
| 2019/0004769 | A1 * | 1/2019 | Kan | G06F 5/012 |
| 2019/0018673 | A1 * | 1/2019 | Langhammer | G06F 7/509 |
| 2019/0042193 | A1 * | 2/2019 | Pasca | G06F 7/4876 |
| 2019/0347256 | A1 * | 11/2019 | Wu | G06F 16/2462 |
| 2020/0026494 | A1 * | 1/2020 | Langhammer | G06F 7/501 |
| 2021/0303302 | A1 * | 9/2021 | Boswell | G06F 9/3012 |
| 2025/0199762 | A1 * | 6/2025 | Langhammer | H03M 7/24 |
| 2025/0378133 | A1 * | 12/2025 | Spreij | G06F 7/5443 |

OTHER PUBLICATIONS

PCT/CN2020/122951—International Search Report and Written Opinion mailed on Jan. 27, 2021, 13 pages.
Yuquan, Yang, "Design of High-performance Floating-point DSP Coprocessor", Information Science and Technology, China Master's Theses Full-Text Database, No. 2, Chapter 2-3, Feb. 15, 2019, 79 pages.
CN201911022958.X—First Office Action mailed on Nov. 23, 2024, 18 pages.

* cited by examiner

COMPUTING APPARATUS AND METHOD FOR VECTOR INNER PRODUCT, AND INTEGRATED CIRCUIT CHIP

CROSS REFERENCE OF RELATED APPLICATION

This is a 371 of International Application No. PCT/CN2020/122951, filed Oct. 22, 2020, which claims priority to: Chinese Patent Application No. 201911022958.X with the title of “Computing Apparatus and Method for Vector Inner Product, and Integrated Circuit Chip” filed on Oct. 25, 2019. The content of the aforementioned applications is are herein incorporated by reference in their entirety.

TECHNICAL FIELD

The present disclosure generally relates to the technical field of floating-point number vector inner product computations. More specifically, the present disclosure relates to a computing apparatus, a method, an integrated circuit chip, and an integrated circuit apparatus for performing a floating-point number vector inner product computation.

BACKGROUND

A vector inner product computation is widely used in computer fields. Taking a machine learning algorithm that is a mainstream algorithm in the field of artificial intelligence that is a current popular application field as an example, common algorithms use a large number of vector inner product computations. This type of computation involves a large number of multiplication and addition operations, and the arrangement of these multiplication and addition apparatuses or methods directly affects the speed of calculus. Although existing technologies have achieved a significant improvement in execution efficiency, there is still room for improvement in processing floating-point number inner products. Therefore, how to obtain a high-efficiency and low-cost unit to perform a floating-point number vector inner product computation has become a problem that is required to be solved in the prior art.

SUMMARY

In order to at least partially solve the technical problem that has been mentioned in BACKGROUND, a technical solution of the present disclosure provides a method, an integrated circuit chip and an apparatus for performing a floating-point number vector inner product computation.

A first aspect of the present disclosure provides a computing apparatus for performing a vector inner product computation, including a multiplication unit and an addition unit. The multiplication unit includes one or more floating-point multipliers, and the floating-point multiplier(s) is configured to multiply an element of a first vector received and a corresponding element of a second vector received to obtain a product result of each pair of corresponding vector elements, where the first vector includes one or more elements and the second vector includes one or more elements. The addition unit is configured to sum product results of elements of the first vector and corresponding elements of the second vector to obtain a summation result.

The aforementioned computing apparatus further includes an update unit, which is configured to, in response to a case that the summation result is an intermediate result of the vector inner product computation, perform multiple addition operations on a plurality of intermediate results that are generated to output a final result of the vector inner product computation.

The aforementioned update unit includes a second adder and a register. The second adder is configured to perform the following operations repeatedly until addition operations of all the plurality of intermediate results are completed: receiving an intermediate result from the addition unit and a previous summation result from the register and a previous addition operation; summing the intermediate result and the previous summation result to obtain a summation result of a present addition operation; and updating a previous summation result stored in the register by using the summation result of the present addition operation.

A second aspect of the present disclosure provides a method for performing a vector inner product computation by using the aforementioned computing apparatus. Steps of the method include: by a floating-point multiplier, an element of a first vector and a corresponding element of a second vector to obtain a product result of each pair of corresponding vector elements; and summing product results of elements of the first vector and corresponding elements of the second vector to obtain a summation result.

A third aspect of the present disclosure provides an integrated circuit chip or an integrated circuit apparatus, including the aforementioned computing apparatus. In one or more embodiments, the computing apparatus of the present disclosure may constitute an independent integrated circuit chip or may be placed on the integrated circuit chip, the integrated circuit apparatus, or a board card, and the computing apparatus of the present disclosure may perform a vector inner product computation on floating-point numbers with more types of different data formats.

By using the computing apparatus, a corresponding computing method, the integrated circuit chip and the integrated circuit apparatus of the present disclosure, a floating-point number vector inner product computation may be performed more efficiently without an excessive expansion of hardware, thereby reducing an arrangement area of an integrated circuit.

BRIEF DESCRIPTION OF DRAWINGS

By reading the following detailed description with reference to drawings, the above-mentioned and other objects, features and technical effects of exemplary embodiments of the present disclosure will become easier to understand. In the drawings, several implementations of the present disclosure are shown in an exemplary but not restrictive manner, and the same or corresponding reference numerals indicate the same or corresponding parts.

DETAILED DESCRIPTION

On the whole, a technical solution of the present disclosure provides a method, an integrated circuit chip and an apparatus for performing a floating-point number vector inner product computation. Different from vector inner product computation methods in the prior art, the present disclosure provides an effective computing solution. The solution may effectively reduce hardware areas and effectively support data with different widths, and the solution may be applicable to more application scenarios of a vector inner product computation.

A vector in the present disclosure may be one-dimensional vector data, or one-dimensional data of high-dimensional data storage formats, such as one row or one column of a matrix, or one-dimensional data of a multi-dimensional tensor, or scalar data in the form of the vector.

The following will describe the technical solution of the present disclosure and a plurality of embodiments of the present disclosure in detail in combination with drawings. It should be understood that many details about vector inner products will be described so that the plurality of embodiments of the present disclosure may be understood thoroughly. However, under the teaching of the content of the present disclosure, those ordinary skill in the art may practice the plurality of embodiments of the present disclosure without these specific details. In other cases, the content of the present disclosure does not detail the well-known methods, processes and components, so as to avoid unnecessarily obscuring the embodiments of the present disclosure. Additionally, the description should also not be regarded as a limitation on the range of the plurality of embodiments of the present disclosure.

Figure 1:
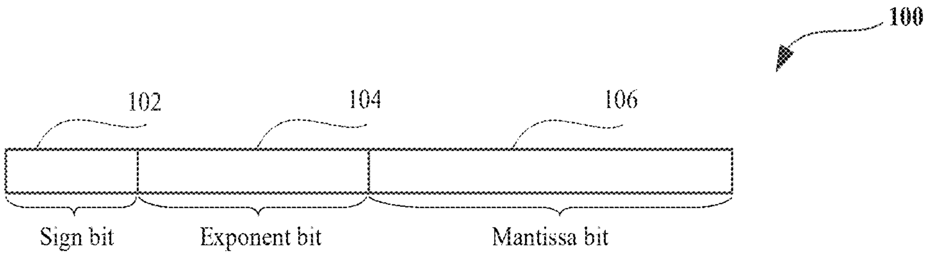
FIG. 1 is a schematic diagram of a floating-point data format according to an embodiment of the present disclosure.

FIG. 1 is a schematic diagram of a floating-point data format 100 according to an embodiment of the present disclosure. As shown in FIG. 1, a floating-point number applicable to a technical solution of the present disclosure may include three parts, including a sign (or a sign bit) 102, an exponent (or an exponent bit) 104, and a mantissa (or a mantissa bit) 106, where for an unsigned floating-point number, there is no sign or sign bit 102. In some embodiments, a floating-point number suitable for a computing apparatus of the present disclosure may include at least one of a half precision floating-point number, a single precision floating-point number, a brain floating-point number, a double precision floating-point number, and a self-definition floating-point number. Specifically, in some embodiments, a floating-point number format applicable to the technical solution of the present disclosure may be a floating-point format conforming to an IEEE754 standard, such as the double precision floating-point number (a float64, which may be abbreviated as an "FP64"), the single precision floating-point number (a float32, which may be abbreviated as an "FP32"), or the half precision floating-point number (a float16, which may be abbreviated as an "FP16"). In some other embodiments, the floating-point number format may be an existing 16-bit brain floating-point number (a bfloat16, which may be abbreviated as a "BFP16"), or the self-definition floating-point number, such as an 8-bit brain floating-point number (a bfloat8, which may be abbreviated as a "BFP8"), an unsigned half precision floating-point number (an unsigned float16, which may be abbreviated as an "UFP16"), and an unsigned 16-bit brain floating-point number (an unsigned bfloat16, which may be abbreviated as an "UBF16"). In order to facilitate understanding, a Table 1 in the following shows part of the above-mentioned data formats, where a sign bit width, an exponent bit width and a mantissa bit width are only used for exemplary descriptions.

TABLE 1

| Data type | Sign bit width | Exponet bit width | Mantissa bit width |
|---|---|---|---|
| FP16 | 1 | 5 | 10 |
| BF16 | 1 | 8 | 7 |
| FP32 | 1 | 8 | 23 |
| BF8 | 1 | 5 | 3 |
| UFP16 | 0 | 5(or 6) | 11(or 10) |
| UBF16 | 0 | 8 | 8 |

For the above-mentioned various floating-point number formats, the computing apparatus of the present disclosure, in operations, may at least support a multiplication operation between two floating-point numbers having any one of the above-mentioned formats, where the two floating-point numbers may have the same or different floating-point data formats. For example, the multiplication operation between the two floating-point numbers may be an FP16*FP16, a BF16*BF16, an FP32*FP32, an FP32*BF16, an FP16*BF16, an FP32*FP16, a BF8*BF16, an UBF16*UFP16, or an UBF16*FP16.

Figure 2:
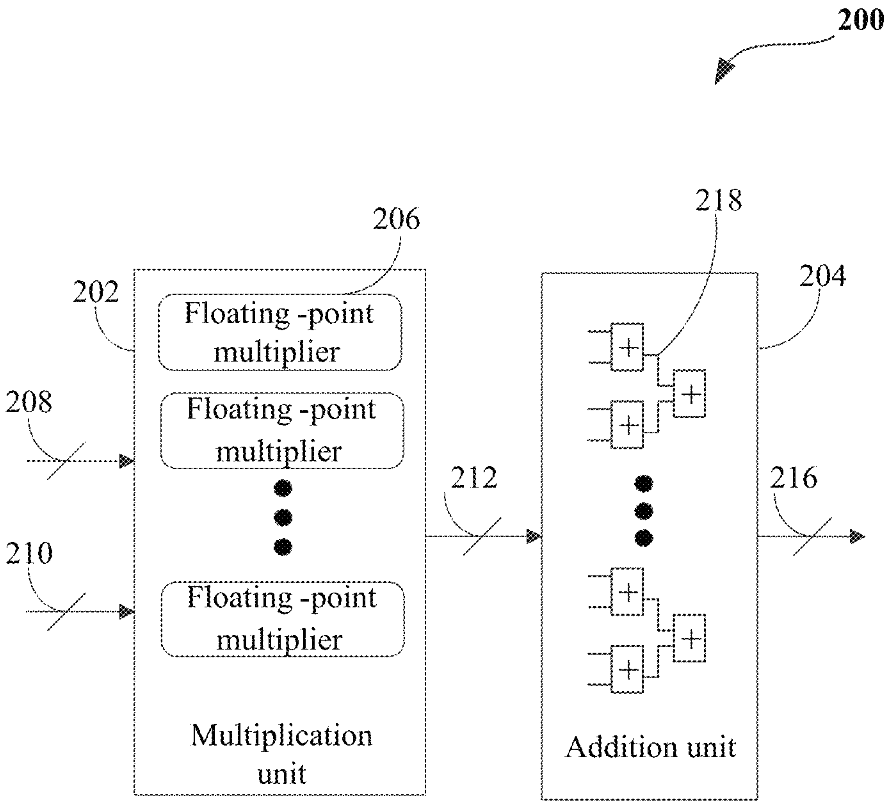
FIG. 2 is a schematic structural diagram of a computing apparatus according to a first embodiment of the present disclosure.

FIG. 2 is a schematic structural diagram of a computing apparatus 200 according to an embodiment of the present disclosure. As shown in FIG. 2, the computing apparatus 200 may include a multiplication unit 202 and an addition unit 204. In an embodiment, the multiplication unit 202 may include a plurality of floating-point multipliers 206, which may be configured to multiply an element of a floating-point number first vector 208 received and a corresponding element of a floating-point number second vector 210 received to obtain a product result 212 of each pair of corresponding vector elements. In this embodiment, the number of floating-point multipliers 206 may be determined according to actual situations, while three floating-point multipliers 206 shown in FIG. 2 are used for an exemplary but not restrictive purpose only. In this embodiment, the first vector 208 and the second vector 210 may be two vectors in the form of k*n, where k is an integer multiple of a data type of the smallest bit width, such as 16 or 32, and n is the number of input data and n is a positive integer. For example, if k is 32 and n is 16, a bit width of input data may be a 512-bit width. Based on this, the first vector 208 and the second vector 210 may be a group of data vectors containing 16 FP32 data elements, a group of data vectors containing 32 FP16 data elements, or a group of data vectors containing 32 BF16 data elements. In other embodiments, input bit widths of the first vector 208 and the second vector 210 may be different. For example, an input bit width of the first vector 208 may be a 1024-bit width, such as 32 FP32s, while an input bit width of the second vector 210 may be the 512-bit width, such as 32 FP16s. There is no direct and necessary correspondence between the number and bit width of the first vector 208 and the number and bit width of the second vector 210, which do not affect each other.

The addition unit 204 may receive product results 212 output by the multiplication unit 202 and perform an addition operation to obtain an inner product result 216, thereby completing an inner product operation. The addition unit 204 may be an adder group composed of a plurality of adders, where the adder group may form a tree structure. For example, the adder group may include a multi-level adder group arranged in a multi-level tree structure, and each level of the adder group may include one or more first adders 218. A first adder 218, for example, may be a floating-point adder. According to different application scenarios and implementations, the first adder 218 may be implemented through a full adder, a half adder, a ripple-carry adder, or a carry-lookahead adder. Additionally, since the floating-point multipliers 206 of the present disclosure are multipliers that support a multi-mode computation, adders in the first adder 218 of the present disclosure may also be adders that support a plurality of types of addition computation modes. For example, if an output of a floating-point multiplier 206 is one of data formats of a half precision floating-point number, a single precision floating-point number, a brain floating-point number, a double precision floating-point number, and a self-definition floating-point number, the first adder 218 may also be a floating-point adder that supports floating-point numbers having any one of the data formats above.

Figure 3:
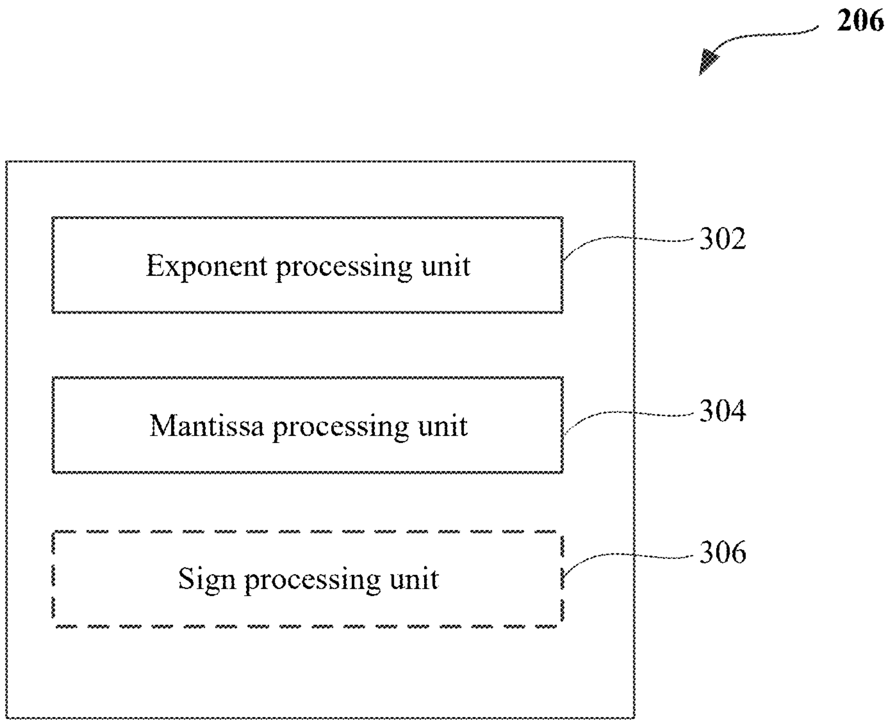
FIG. 3 is a schematic structural diagram of a floating-point multiplier according to an embodiment of the present disclosure.

In this embodiment, the floating-point multiplier 206 of the multiplication unit 202 may have a plurality of types of computation modes, so that a multi-mode multiplication computation may be performed on a plurality of elements included in the first vector 208 and a plurality of corresponding elements included in the second vector 210. FIG. 3 is a schematic structural diagram of a floating-point multiplier 206 according to an embodiment of the present disclosure. As mentioned earlier, the floating-point multiplier 206 of the present disclosure may support multiplication operations of floating-point number vectors with various data formats, and these data formats may be indicated by computation modes of the present disclosure, so that the floating-point multiplier 206 may work in one of a plurality of types of computation modes.

As shown in FIG. 3, the floating-point multiplier 206 of the present disclosure may overall include an exponent processing unit 302 and a mantissa processing unit 304, where the exponent processing unit 302 is used to process an exponent bit of a floating-point number, and the mantissa processing unit 304 is used to process a mantissa bit of the floating-point number. Optionally or additionally, in some embodiments, if a floating-point number processed by the floating-point multiplier 206 has s sign bit, a sign processing unit 306 may also be included in the floating-point multiplier 206, and the sign processing unit 306 is used to process a floating-point number with the sign bit.

In an operation, according to one of the computation modes, the floating-point multiplier 206 may perform vector inner product computations on the first vector 208 and the second vector 210 that are received, input, or cached, where the element of the first vector 208 and the corresponding element of the second vector 210 have one of the floating-point data formats discussed earlier. For example, if the floating-point multiplier 206 is in a first computation mode, the floating-point multiplier 206 may support a multiplication computation between two floating-point numbers FP16*FP16. However, if the floating-point multiplier 206 is in a second computation mode, the floating-point multiplier 206 may support a multiplication computation between two floating-point numbers BF16*BF16. Similarly, if the floating-point multiplier 206 is in a third computation mode, the floating-point multiplier 206 may support a multiplication computation between two floating-point numbers FP32*FP32. However, if the floating-point multiplier 206 is in a fourth computation mode, the floating-point multiplier 206 may support a multiplication computation between two floating-point numbers FP32*BF16. Here, corresponding relationships between exemplary computation modes and floating-point numbers are shown in a Table 2 below.

TABLE 2

| Computation mode serial number (in_mode) | Computation floating-point number type |
|---|---|
| 1 | FP16*FP16 |
| 2 | BF16*BF16 |
| 3 | FP32*FP32 |
| 4 | FP32*BF16 |

Figure 16:
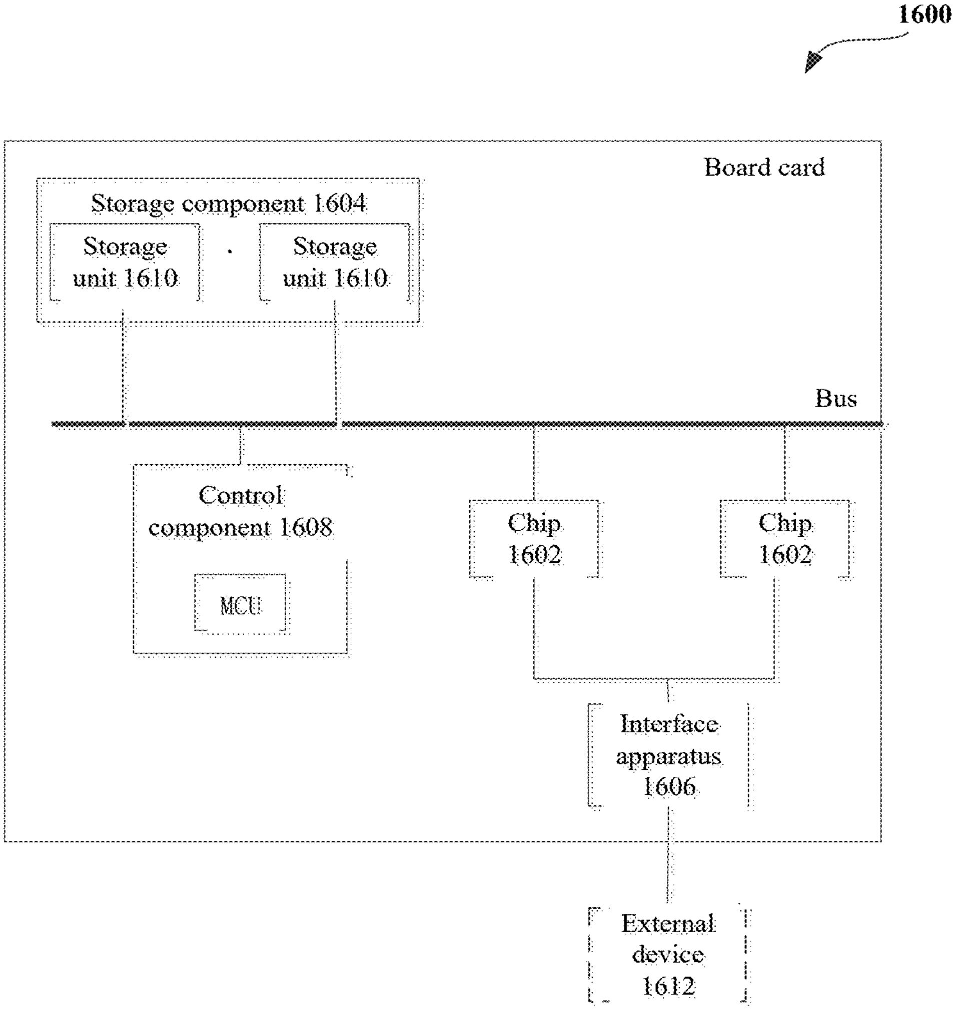
FIG. 16 is a schematic structural diagram of a board card according to an embodiment of the present disclosure.

In an embodiment, the Table 2 above may be stored in a memory in the floating-point multiplier 206, and the floating-point multiplier 206 may select one of the computation modes in the table according to an instruction received from an external device, where the external device, for example, may be an external device 1612 shown in FIG. 16. In another embodiment, an input of the computation mode may be implemented automatically by a mode selection unit 418 shown in FIG. 4. For example, if two FP16-type floating-point number vectors are input into the floating-point multiplier 206 of the present disclosure, the mode selection unit 418 may select the floating-point multiplier 206 to work in the first computation mode according to data formats of the two floating-point numbers. For another example, if a FP32-type floating-point number and a BF16-type floating-point number are input into the floating-point multiplier 206 of the present disclosure, the mode selection unit 418 may select the floating-point multiplier 206 to work in the fourth computation mode according to the data formats of the two floating-point numbers.

It may be shown that different computation modes of the present disclosure are associated with corresponding floating-point-type data. In other words, the computation mode of the present disclosure may be used to indicate a data format of the element of the first vector 208 and a data format of the corresponding element of the second vector 210. In another embodiment, the computation mode of the present disclosure may not only indicate the data format of the element of the first vector 208 and the data format of the corresponding element of the second vector 210, but also indicate a data format after a multiplication computation. In connection with the Table 2, expanded computation modes may be shown in a Table 3 below.

TABLE 3

| Computation mode serial number (in_mode) | Computation floating-point number type | Output result type (out_mode) |
|---|---|---|
| 11 | FP16*FP16 | FP16 |
| 12 | | BF16 |
| 13 | | FP32 |
| 21 | BF16*BF16 | FP16 |
| 22 | | BF16 |
| 23 | | FP32 |
| 31 | FP32*FP32 | FP16 |
| 32 | | BF16 |
| 33 | | FP32 |
| 41 | FP32*BF16 | FP16 |
| 42 | | BF16 |
| 43 | | FP32 |

Different from computation mode serial numbers shown in Table 2, computation modes in the Table 3 are expanded by one bit to indicate a data format after a floating-point number vector multiplication computation. For example, if the floating-point multiplier 206 works in a computation mode 21, the floating-point multiplier 206 may perform a vector inner product computation on two floating-point numbers BF16*BF16 that are input, and then the floating-point multiplier 206 may output the two floating-point numbers in a data format of FP16 after the floating-point multiplication computation.

The above description of indicating floating-point data formats by using the computation modes in the form of serial numbers is exemplary but not restrictive. According to the teaching of the present disclosure, it is also conceivable to establish an index according to the computation modes, so as to determine a format of a multiplier and a format of a multiplicand. For example, the computation mode may include two indexes, and a first index may be used to indicate a type of the element of the first vector 208, and a second index may be used to indicate a type of the corresponding element of the second vector 210. For example, in a computation mode 13, a first index "1" may indicate that a format of the element of the first vector 208 (or called the multiplicand) is a first floating-point format, which is FP16, and a second index "3" may indicate that a format of the corresponding element of the second vector 210 (or called the multiplier) is a second floating-point format, which is FP32. Further, a third index may be added to the computation modes. The third index may indicate a data format of an output result. For example, in a computation mode 131, a third index "1" may indicate that the data format of the output result is the first floating-point format, which is FP16. As the number of the computation modes increases, according to requirements, a corresponding index may be increased or the level of the index may be increased, so as to determine relationships between the computation modes and the data formats.

Additionally, although here serial numbers are illustratively used to refer to the computation modes, in other examples, according to application requirements, other signs or codes may be used to refer to the computation modes, such as letters, signs, numbers or combinations thereof, and the like. Through such expressions including letters, numbers, signs or combinations thereof, the computation modes may be indicated and the data format of the element of the first vector 208, the data format of the corresponding element of the second vector 210, and the data format of the output result may be identified. Additionally, if these expressions are formed in the form of an instruction, the instruction may include three domains or three fields, where a first domain is used to indicate the data format of the element of the first vector 208, a second domain is used to indicate the data format of the corresponding element of the second vector 210, and a third domain is used to indicate the data format of the output result. Of course, these domains may be merged into one domain, or a new domain may be added, so as to indicate more contents related to the floating-point data formats. It may be shown that the computation modes of the present disclosure may not only be associated with the data format of the floating-point number that is input, but also may be used to normalize the output result, so as to obtain a product result with an expected data format.

Figure 4:
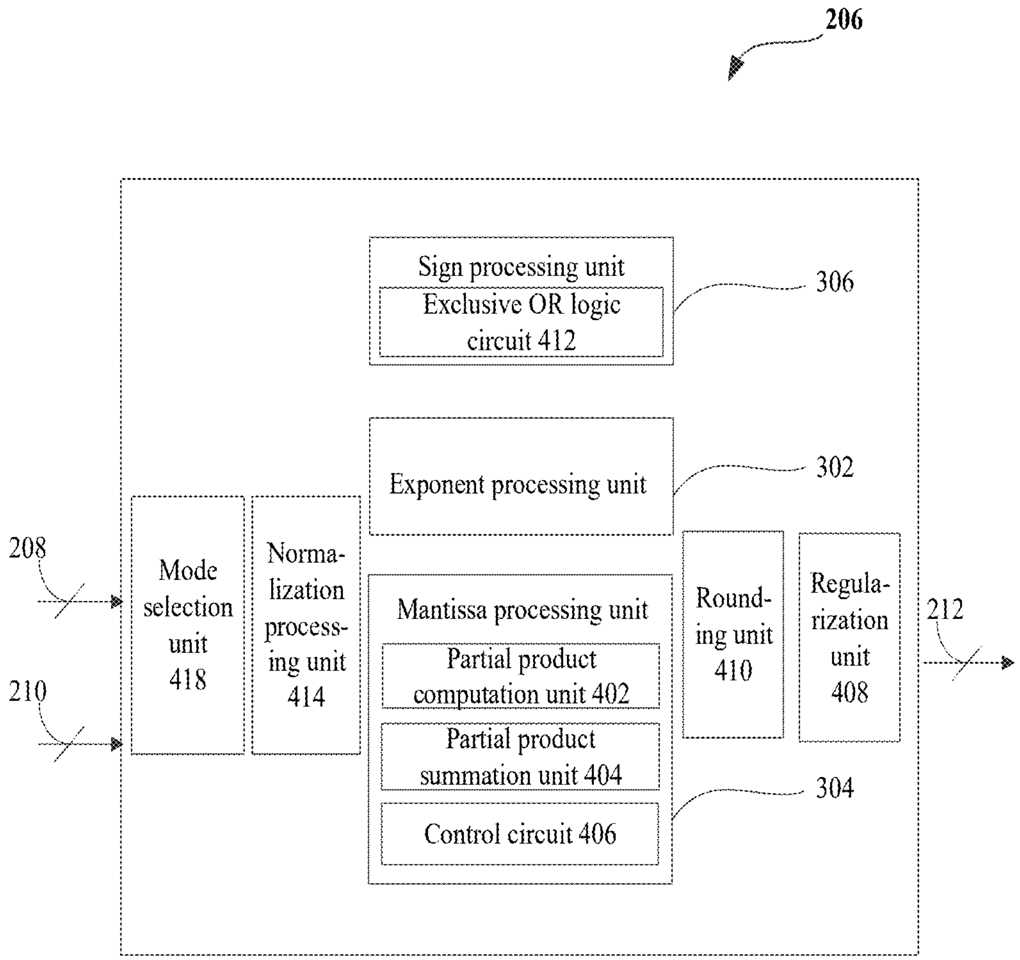
FIG. 4 is a schematic structural diagram illustrating more details about a floating-point multiplier according to an embodiment of the present disclosure.

FIG. 4 is a structural diagram illustrating more details about a floating-point multiplier 206 according to an embodiment of the present disclosure. From the content of FIG. 4, it may be shown that FIG. 4 not only includes the exponent processing unit 302, the mantissa processing unit 304 and the sign processing unit 306 that is optional shown in FIG. 3, but also includes internal components that these units may include and units that are related to operations of these units. Exemplary operations of these units are described in detail hereinafter with reference to FIG. 4.

In order to perform a floating-point number vector multiplication computation, the exponent processing unit 302 may be used to obtain an exponent after the multiplication computation according to the above-mentioned computation mode, an exponent of the element of the first vector 208, and an exponent of the corresponding element of the second vector 210. In an embodiment, the exponent processing unit 302 may be implemented through an addition and subtraction circuit. For example, here, the exponent processing unit 302 may be used to sum the exponent of the element of the first vector 208 and an offset of an input floating-point data format corresponding to the element of the first vector 208, and sum the exponent of the corresponding element of the second vector 210 and an offset of an input floating-point data format corresponding to the corresponding element of the second vector 210, and then subtract offsets of output floating-point data formats, so as to obtain the exponent after the multiplication computation of the element of the first vector 208 and the corresponding element of the second vector 210.

Further, the mantissa processing unit 304 of the floating-point multiplier 206 may be used to obtain a mantissa after the multiplication computation according to the above-mentioned computation mode, the element of the first vector 208, and the corresponding element of the second vector 210. In an embodiment, the mantissa processing unit 304 may include a partial product computation unit 402 and a partial product summation unit 404, where the partial product computation unit 402 is used to obtain intermediate results according to mantissas of elements of the first vector 208 and mantissas of the corresponding elements of the second vector 210. In some embodiments, the intermediate results may be a plurality of partial products obtained by multiplying elements of the first vector 208 and corresponding elements of the second vector 210 (as schematically shown in both FIG. 6 and FIG. 7). The partial product summation unit 404 is used to sum the intermediate results to obtain a summation result and then take the summation result as the mantissa after the multiplication computation.

In order to obtain the intermediate results, in an embodiment, the present disclosure uses a Booth encoding circuit to fill high and low bits of the mantissas of the corresponding elements of the second vector 210 (for example, acting as a multiplier in a floating-point computation) with 0 (where filling high bits with 0 is to take the mantissas as unsigned numbers to be transformed into signed numbers), so as to obtain the intermediate results. It is required to be understood that, according to different encoding methods, the mantissas of the elements of the first vector 208 (for example, acting as a multiplicand in the floating-point computation) may be encoded (for example, filling the high and low bits with 0), or both the mantissas of the elements of the first vector 208 and the mantissas of the corresponding elements of the second vector 210 may be encoded, so as to obtain the plurality of partial products. More descriptions about partial products may be made later in combination with drawings.

In another embodiment, the partial product summation unit 404 may include an adder, where the adder is used to sum the intermediate results to obtain the summation result. In another embodiment, the partial product summation unit 404 may include a Wallace tree and the adder, where the Wallace tree is used to sum the intermediate results to obtain second intermediate results, and the adder is used to sum the second intermediate results to obtain the summation result. In these embodiments, the adder may include at least one of a full adder, a serial adder, and a carry-lookahead adder.

In an embodiment, the mantissa processing unit 304 may further include a control circuit 406. The control circuit 406 is used to invoke the mantissa processing unit 304 multiple times according to the computation mode when a computation unit indicates that a mantissa bit width of at least one of the element of the first vector 208 or the corresponding element of the second vector 210 is greater than a data bit width that is processable by the mantissa processing unit 304 at one time. The control circuit 406, in an embodiment, may be implemented to be used to generate a control signal, such as a counter or an indicating bit of control, and the like. In order to achieve multiple invocations here, the partial product summation unit 404 may further include a shifter. When the control circuit 406 invokes the mantissa processing unit 304 multiple times according to the computation mode, the shifter is used to shift an existing summation result in each invocation and add the shifted summation result to a summation result obtained in a current invocation to obtain a new summation result and take a new summation result obtained in a final invocation as the mantissa after the multiplication computation.

In an embodiment, the floating-point multiplier 206 of the present disclosure may further include a regularization unit 408 and a rounding unit 410. The regularization unit 408 may be used to perform floating-point number regularization processing on the mantissa after the multiplication computation and the exponent after the multiplication computation to obtain a regularized exponent result and a regularized mantissa result and take the regularized exponent result as the exponent after the multiplication computation and take the regularized mantissa result as the mantissa after the multiplication computation. For example, according to a data format indicated by the computation unit, the regularization unit 408 may adjust a bit width of an exponent and a bit width of a mantissa to make the bit width of the exponent and the bit width of the mantissa meet requirements of the data format indicated above. Additionally, the regularization unit 408 may make other adjustments to the exponent or the mantissa. For example, in some application scenarios, if a value of the mantissa is not 0, the most significant bit of a mantissa bit should be 1; otherwise, an exponent bit may be modified and the mantissa bit may be shifted at the same time to make the number become a normalized number. In another embodiment, the regularization unit 408 may make an adjustment to the exponent after the multiplication computation according to the mantissa after the multiplication computation. For example, if the highest bit of the mantissa after the multiplication computation is 1, an exponent obtained after the multiplication computation may be increased by 1. Accordingly, the rounding unit 410 may be used to perform a rounding operation on the regularized mantissa result according to a rounding mode and take the mantissa after the rounding operation as the mantissa after the multiplication computation. According to different application scenarios, the rounding unit 410 may perform rounding operations, for example, including rounding down, rounding up, and rounding to the nearest significand. In some application scenarios, the rounding unit 410 may further round 1 that is shifted from a process of shifting the mantissa to the right.

Other than the exponent processing unit 302 and the mantissa processing unit 304, the floating-point multiplier 206 of the present disclosure may optionally include the sign processing unit 306. If an input vector is a floating-point number with a sign bit, the sign processing unit 306 may be used to obtain a sign after the multiplication computation according to a sign of the element of the first vector 208 and a sign of the corresponding element of the second vector 210. For example, in an embodiment, the sign processing unit 306 may include an exclusive OR logic circuit 412. The exclusive OR logic circuit 412 may be used to perform an exclusive OR computation to obtain the sign after the multiplication computation according to the sign of the element of the first vector 208 and the sign of the corresponding element of the second vector 210. In another embodiment, the sign processing unit 306 may be implemented through a true-value table or a logical judgment.

Additionally, in order to make both the element of the first vector and the corresponding element of the second vector that are input or received conform to a specified format, in an embodiment, the floating-point multiplier 206 of the present disclosure may further include a normalization processing unit 414. The normalization processing unit 414 may be used to perform normalization processing on the element of the first vector 208 and the corresponding element of the second vector 210 according to the computation mode when the element of the first vector 208 or the corresponding element of the second vector 210 are non-normalized and non-zero floating-point numbers, so as to obtain corresponding exponents and corresponding mantissas. For example, if a selected computation mode is the second computation mode shown in Table 2 while both the element of the first vector 208 and the corresponding element of the second vector 210 that are input are FP16-type data, the normalization processing unit 414 may be used to normalize the FP16-type data into BF16-type data, so as to enable the floating-point multiplier 206 to be operated in the second computation mode. In one or more embodiments, the normalization processing unit 414 may be further used to perform preprocessing (for example, expanding the mantissas) on a mantissa of a normalization floating-point number having a hidden 1 and a mantissa of a non-normalization floating-point number without the hidden 1, so as to facilitate a subsequent operation of the mantissa processing unit 304. Based on the description above, it may be understood that here, the normalization processing unit 414 and the regularization unit 408 above, in some embodiments, may perform the same or similar operations. The difference is that the normalization processing unit 414 is used to perform normalization processing on floating-point data that is input, while the regularization unit 408 is used to perform regularization processing on the mantissa and the exponent that are to be output.

The above describes the floating-point multiplier 206 and the plurality of embodiments in the present disclosure in combination with FIG. 4. Based on the description above, those skilled in the art may understand that according to a solution of the present disclosure, by executing the floating-point multiplier 206, a result after the multiplication computation (including the exponent, the mantissa and the sign that is optional) may be obtained. According to different application scenarios, for example, if the aforementioned regularization processing and the aforementioned rounding processing are not required, a result obtained by the mantissa processing unit 304 and the exponent processing unit 302 may be regarded as a final computation result 212. Further, if the aforementioned regularization processing and the aforementioned rounding processing are required, the exponent and the mantissa that are obtained after the regularization processing and the rounding processing may be regarded as the final computation result 212, or a part of the final computation result (when a final sign is considered). Further, according to the solution of the present disclosure, through the plurality of types of computation modes, the floating-point multiplier 206 may support floating-point number computations with different types or data formats, thereby realizing a reuse of the floating-point multiplier 206 and saving chip design overheads and calculation costs. Additionally, through a multiple invocation mechanism, the computing apparatus of the present disclosure may further support a calculation on a floating-point number with a high bit width. Since in a floating-point number multiplication operation, a multiplication operation of the mantissa (or called the mantissa bit or a mantissa part) is critical to performance of entire vector inner products. The following will describe a mantissa operation in combination with FIG. 5.

Figure 5:
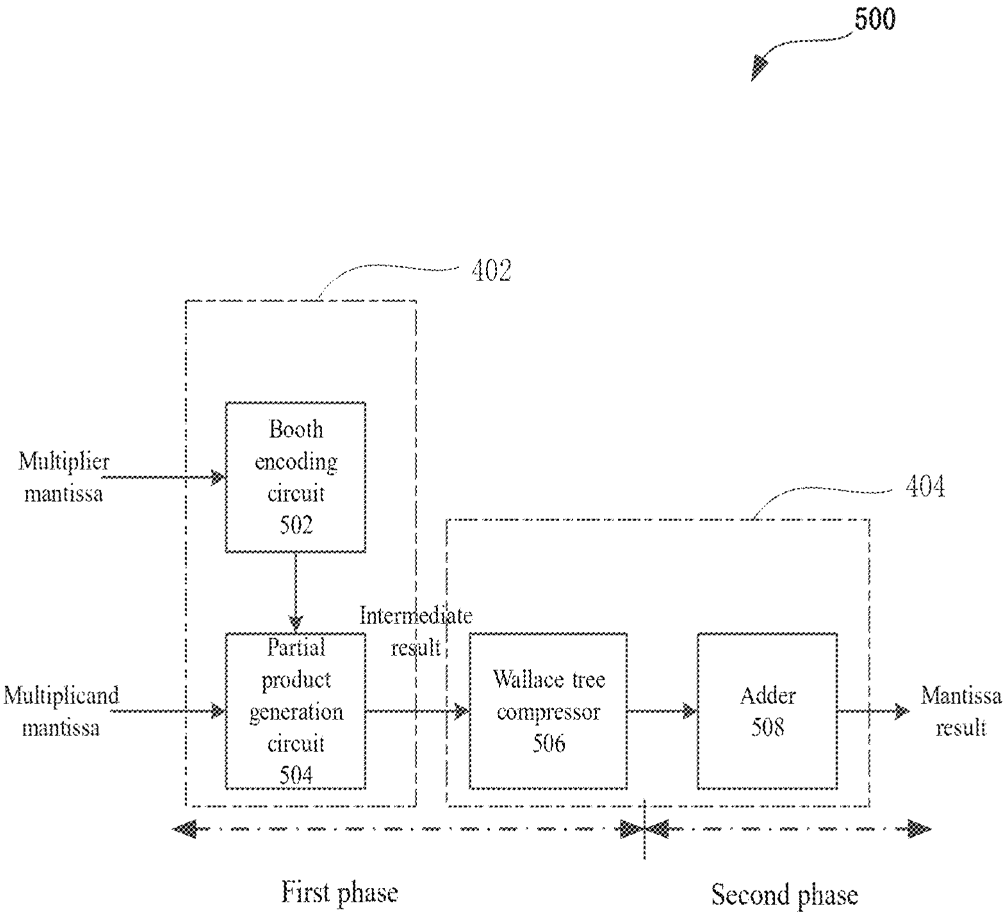
FIG. 5 is a schematic block diagram of a partial product computation unit and a partial product summation unit according to an embodiment of the present disclosure.

FIG. 5 is a schematic diagram of a mantissa processing unit operation 500 according to an embodiment of the present disclosure. As shown in FIG. 5, the mantissa processing operation 500 of the present disclosure involves two units, including the partial product computation unit 402 and the partial product summation unit 404 that are described above in combination with FIG. 4. In terms of operating sequence, the mantissa processing operation 500 may be generally divided into a first phase and a second phase, where in the first phase, the mantissa processing operation 500 may obtain an intermediate result, and in the second phase, the mantissa processing operation 500 may obtain a mantissa result that is output from an adder 508.

In an exemplary specific operation, the element of the first vector 208 and the corresponding element of the second vector 210 that are received by the floating-point multiplier 206 may be divided into a plurality of parts, including the aforementioned sign (which is optional), the aforementioned exponent, and the aforementioned mantissa. Optionally, after normalization processing, mantissa parts of two floating-point numbers may enter the mantissa processing unit (such as the mantissa processing unit 304 in FIG. 3 or FIG. 4) as inputs and specifically enter the partial product computation unit 402. As shown in FIG. 5, the present disclosure uses a Booth encoding circuit 502 to fill high and low bits of mantissas of corresponding elements of the second vector 210 (which are multipliers in a floating-point computation) with 0 and perform Booth encoding processing, so as to obtain the intermediate results in a partial product generation circuit 504. Of course, in some application scenarios, the element of the first vector 208 may be the multiplier, while the corresponding element of the second vector 210 may be a multiplicand. Accordingly, in some encoding processing, an encoding operation may also be performed on floating-point numbers acting as the multiplicands.

In order to better understand a technical solution of the present disclosure, the following will briefly introduce the Booth encoding. Generally, when two binary numbers are multiplied, through a multiplication operation, a large number of intermediate results called partial products may be generated, and then an accumulation operation may be performed on these partial products to obtain a final result of multiplying the two binary numbers. The more the partial products, the larger the area and power consumption of array floating-point multipliers 206, the slower the execution speed, and the more difficult it is to implement the circuit. However, a purpose of the Booth encoding is to effectively decrease the number of summation terms of the partial products and further reduce an area of the circuit. The algorithm of the Booth encoding is to encode an input multiplier according to a corresponding rule first. In an embodiment, encoding rules may be rules shown in a Table 4 below.

TABLE 4

| To-be-encoded data | | | Encoding signal |
|---|---|---|---|
| $y_{2i+1}$ | y2i | y2i−1 | PPi |
| 0 | 0 | 0 | 0 |
| 0 | 0 | 1 | X |
| 0 | 1 | 0 | X |
| 0 | 1 | 1 | 2X |
| 1 | 0 | 0 | −2X |
| 1 | 0 | 1 | −X |
| 1 | 1 | 0 | −X |
| 1 | 1 | 1 | −0(=0) |

In Table 4, $y_{2i+1}$, $y_{2i}$, and $y_{2i-1}$ may represent values corresponding to each group of to-be-encoded sub-data (which are the multipliers), and X may represent a mantissa of the element of the first vector 208 (which is a multiplicand). After Booth encoding processing is performed on each group of corresponding to-be-encoded data, a corresponding encoding signal PPi (where i is equal to 0, 1, 2, . . . , n) may be obtained. As illustratively shown in Table 4, the encoding signal obtained after the Booth encoding may include five types, including −2X, 2X, −X, X, and 0. Exemplarily, based on the above-mentioned encoding rules, if the multiplicand that is received is a piece of 8-bit data "$X_7X_6X_5X_4X_3X_2X_1X_0$", the following partial products may be obtained.

(1) If a multiplier bit includes consecutive 3-bit data "001" in the table above, a partial product is X and may be expressed as "$X_7X_6X_5X_4X_3X_2X_1X_0$", and a ninth bit is a sign bit, which is PPi={X[7], X}; (2) if the multiplier bit includes consecutive 3-bit data "011" in the table above, the partial product is 2X and may represent that X is shifted to the left by one bit and "$X_7X_6X_5X_4X_3X_2X_1X_00$" is obtained, which is PPi={X, 0}; (3) if the multiplier bit includes consecutive 3-bit data "101" in the table above, the partial product is −X and may be expressed as $$“\overline{X_7X_6X_5X_4X_3X_2X_1X_0} + 1”$$

representing inverting "$X_7X_6X_5X_4X_3X_2X_1X_0$" bit by bit and then adding 1, which is PPi=~{X[7], X}+1;

(4) if the multiplier bit includes consecutive 3-bit data "100" in the table above, the partial product is −2X and may be expressed as $$\overline{X_7X_6X_5X_4X_3X_2X_1X_0}1 + 1$$

representing shifting "$X_7X_6X_5X_4X_3X_2X_1X_0$" to the left by one bit and inverting it and then adding 1, which is PPi=~{X, 0}+1; (5) if the multiplier bit includes consecutive 3-bit data "111" or "000" in the table above, the partial product is 0, which is PPi={9' b0}.

It should be understood that the above description of a process of obtaining the partial products in combination with Table 4 is only exemplary but not restrictive. Under the teaching of the present disclosure, those skilled in the art may change the rules in Table 4 to obtain a partial product different from those shown in Table 4. For example, if the multiplier bit includes a specific number having consecutive multiple bits (such as 3 bits or more than 3 bits), the partial product that is obtained may be a complement code of the multiplicand, or for example, an "adding 1" operation in the above (3) and (4) may be performed after the partial products are summed.

Based on the description above, it may be understood that by encoding the mantissas of the corresponding elements of the second vector 210 by using the Booth encoding circuit 502 and by using the mantissas of the elements of the first vector 208, the plurality of partial products may be generated from the partial product generation circuit 504 as the intermediate results, and the intermediate results may be input into a Wallace tree compressor 506 in the partial product summation unit 404. It should be understood that here, using the Booth encoding to obtain the partial products is only a preferred method for obtaining the partial products in the present disclosure, and those skilled in the art may also obtain the partial products in other ways. For example, a shift operation may also be used to obtain the partial products. In other words, according to whether a bit value of the multiplier is 1 or 0, a shift plus the multiplicand or a shift plus 0 may be selected to obtain corresponding partial products. Similarly, using the Wallace tree compressor 506 to perform the addition operation on the partial product is only exemplary but not restrictive, and those skilled in the art may perform the addition operation on the partial products by using other types of adders. The other types of adders may be various combinations of one or more full adders, half adders or the two.

Regarding the Wallace tree compressor 506 (a Wallace tree for short), the Wallace tree compressor 506 is mainly used to sum the intermediate results (such as the plurality of partial products), so as to reduce the number of times of accumulating the partial products (such as compression). Generally, the Wallace tree compressor 506 may adopt a carry-save structure and a Wallace tree algorithm, where the calculation speed of using a Wallace tree array is much faster than that of using the addition of a traditional carry-propagate structure.

Specifically, the Wallace tree compressor 506 may sum the partial products in each row in parallel. For example, the number of times of accumulating N partial products may be decreased from N−1 to $Log_2N$, thereby improving the speed of the floating-point multiplier 206, which is of great significance to the effective utilization of resources. According to different application requirements, the Wallace tree compressor 506 may be designed to a plurality of types, such as a 7-2 Wallace tree, a 4-2 Wallace tree, and a 3-2 Wallace tree, and the like. In one or more embodiments, the present disclosure uses the 7-2 Wallace tree as an example for performing various vector inner products. More detailed descriptions will be made later in combination with FIG. 6 and FIG. 7.

In some embodiments, a Wallace tree compression operation of the present disclosure may be arranged with M inputs and N outputs, and the number of Wallace trees may not be less than K, where N is a preset positive integer that is less than M, and K is a positive integer that is not less than the largest bit width of the intermediate results. For example, M may be 7, and N may be 2, which is the 7-2 Wallace tree that will be detailed in the following. If the largest bit width of the intermediate results is 48, K may be a positive integer 48; in other words, the number of Wallace trees may be 48.

In some embodiments, according to a computation mode, one group or a plurality of groups of Wallace trees may be selected to sum the intermediate results, where each group has X Wallace trees, and X is the bit number of the intermediate results. Further, there is a sequential carry relationship between the Wallace trees within each group, but there is no carry relationship between each group. In an exemplary connection, the Wallace tree compressor 506 may be connected through a carry. For example, a carry output (such as a Cin in FIG. 7) from a low-bit Wallace tree compressor 506 may be sent to a high-bit Wallace tree, while a carry output (such as a Cout) may be a carry input for a higher-bit Wallace tree compressor 506 to receive the low-bit Wallace tree compressor 506. Additionally, when one or more Wallace trees is selected from a plurality of Wallace tree compressors 506, a selection may be made arbitrarily. For example, the selection may be made based on a number sequence in order of 0, 1, 2, and 3, and the like, or based on a number sequence in order of 0, 2, 4, and 6, and the like, as long as a selected Wallace tree compressor 506 is selected according to the above-mentioned carry relationship.

The following will introduce the Wallace tree above and the operation of the Wallace tree in combination with an illustrative example. For example, both the element of the first vector 208 and the corresponding element of the second vector 210 are 16-bit data, a computing apparatus supports an input bit width of 32 bits (thereby supporting a parallel multiplication operation on two groups of 16-bit data), and the Wallace tree is the 7-2 Wallace tree compressor 506 with 7 (which is an exemplary value of the above M) inputs and 2 (which is an exemplary value of the above N) outputs. In this exemplary scenario, 48 (which is an exemplary value of the above K) Wallace trees may be adopted to complete a multiplication computation on the two groups of data in parallel.

In the 48 Wallace trees above, 0th to 23rd Wallace trees (which are 24 Wallace trees in a first group of Wallace trees) may complete a partial product summation computation of a multiplication computation of the first group, and the Wallace trees in this group may be connected through the carry sequentially. Further, 24th to 47th Wallace trees (which are 24 Wallace trees in a second group of Wallace trees) may complete a partial product summation computation of a multiplication computation of the second group, and the Wallace trees in this group may be connected through the carry sequentially. Additionally, there is no carry relationship between a 23rd Wallace tree in the first group and a 24th Wallace tree in the second group; in other words, there is no carry relationship between the Wallace trees of different groups.

Returning to FIG. 5, after the partial products are summed and compressed through the Wallace tree compressor 506, partial products that are compressed may be summed through the adder 508, so as to obtain a result of a mantissa multiplication operation. Regarding the adder 508, in one or more embodiments of the present disclosure, the adder 508 may include one of a full adder, a serial adder and a carry-lookahead adder. The adder 508 may be used to perform a summation operation on the last two rows of partial products obtained by summing by the Wallace tree compressors 506, so as to obtain the result of the mantissa multiplication operation.

It may be understood that through the mantissa multiplication operation shown in FIG. 5, especially by illustratively using the Booth encoding and the Wallace tree, the result of the mantissa multiplication operation may be obtained effectively. Specifically, the Booth encoding processing may effectively decrease the number of the summation terms of the partial products and further reduce the area of the circuit, while the Wallace tree compressor may sum the partial products in each row in parallel and further improve the speed of the computing apparatus.

Figure 6:
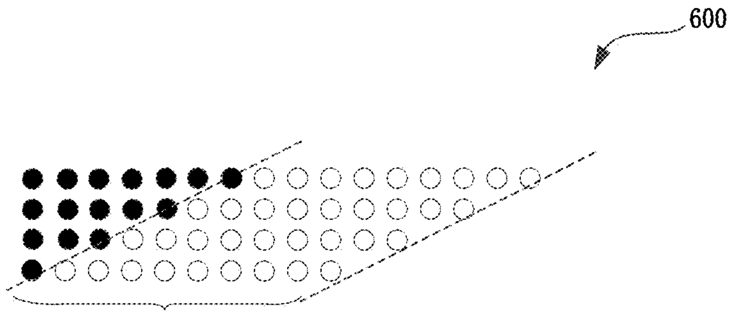
FIG. 6 is a schematic diagram of a partial product operation according to an embodiment of the present disclosure.
Figure 7:
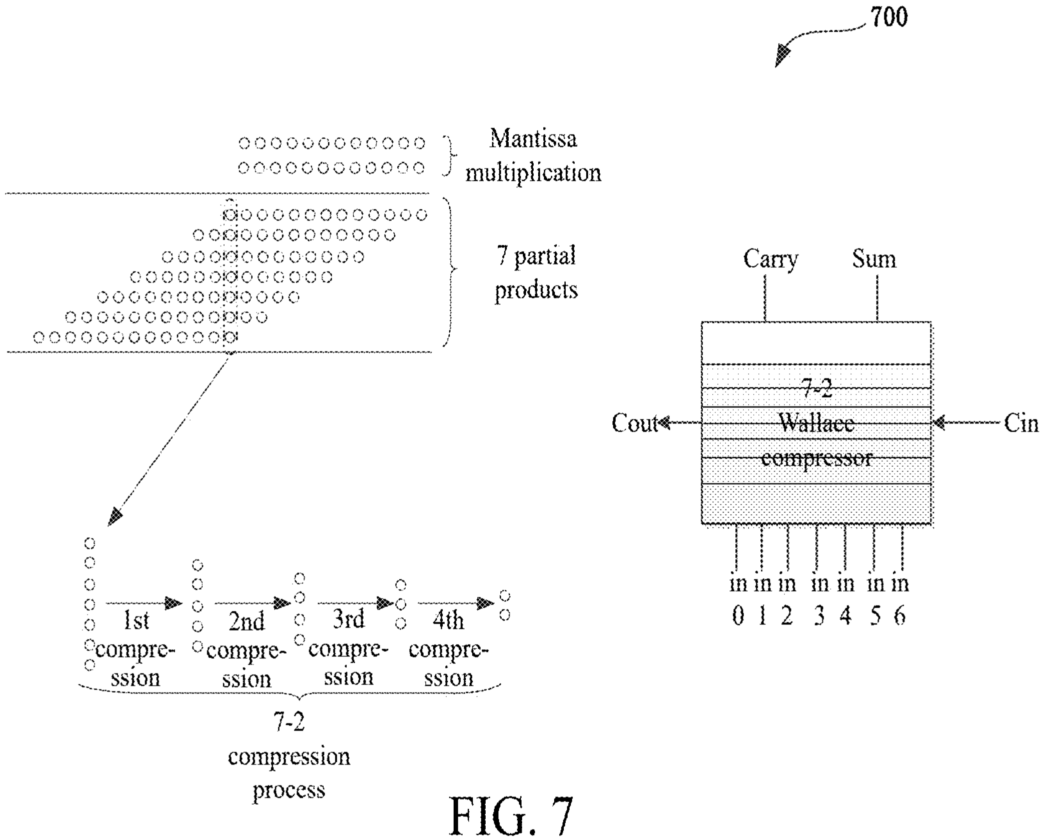
FIG. 7 is an operation process and a schematic block diagram of a Wallace tree compressor according to an embodiment of the present disclosure.

The following will describe an exemplary operation process of the partial products and the 7-2 Wallace tree in detail in combination with FIG. 6 and FIG. 7. It may be understood that the description here is only exemplary but not restrictive, and a purpose of the description is only to better understand the solution of the present disclosure.

FIG. 6 shows a partial product 600 obtained after passing through the partial product generation circuit 504 in the mantissa processing unit 304 described in combination with FIGS. 3 to 5, such as four rows of white dots between two dashed lines in figure, where each row of white dots identifies one partial product. In order to facilitate subsequent executions of the Wallace tree compressor 506, a bit number may be expanded in advance. For example, black dots in FIG. 6 are values of the highest bits of each copied 9-bit partial product. It may be known that partial products are expanded to be aligned to 16(8+8) bits (which is 8-bit width of a multiplicand mantissa+8-bit width of a multiplier mantissa). In another embodiment, for example, for partial products of a 25*13 binary multiplication, the partial products may be expanded to 38(25+13) bits (which is 25-bit width of the multiplicand mantissa+13-bit width of the multiplier mantissa).

FIG. 7 is an operation process and a schematic block diagram 700 of a Wallace tree compressor 506 according to an embodiment of the present disclosure.

As shown in FIG. 7, after a multiplication operation is performed on mantissas of two floating-point numbers, as described earlier, by performing Booth encoding on a multiplier and based on a multiplicand, 7 partial products shown in FIG. 7 may be obtained. Due to the use of a Booth encoding algorithm, the number of partial products generated may be decreased. In order to facilitate understanding, in a partial product part of the figure, a dashed box is used to identify a Wallace tree including 7 elements, and a compression process of the Wallace tree from 7 elements to 2 elements is further shown with arrows. In an embodiment, this compression process (or called a summation process) may be implemented by using a full adder; in other words, three elements may be input and two elements may be output (including one "sum" and one "carry" for a high bit). A schematic block diagram of a 7-2 Wallace tree compressor 506 is shown in a right side of FIG. 7. It may be understood that the Wallace tree compressor 506 includes 7 inputs from one column of partial products (such as 7 elements that are identified in a dashed box in a left side of FIG. 7). In operations, a carry input of a 0th column of the Wallace tree is 0, and a carry output Cout of each column of Wallace trees may be used as a carry input Cin of a next column of Wallace trees.

From the left part of FIG. 7, it may be known that after four compressions, a Wallace tree including 7 elements may be compressed to a Wallace tree including 2 elements. As mentioned earlier, the present disclosure uses the 7-2 Wallace tree compressor 506 to compress 7 rows of partial products to 2 rows of partial products finally (which is a second intermediate result of the present disclosure), and the present disclosure uses an adder (such as a carry-lookahead adder) to obtain a mantissa result.

In order to further explain principles of the solution of the present disclosure, the following will exemplarily describe how the floating-point multiplier 206 of the present disclosure completes operations in a first phase in four computation modes including FP16*FP16, BF16*BF16, FP32*FP32, and FP32*BF16, which is until the Wallace tree compressor 506 completes a summation of intermediate results to obtain second intermediate results.

(1) FP16*FP16

In this computation mode of the floating-point multiplier 206, a mantissa bit of a floating-point number is 10-bit, and considering a non-normalized and non-zero number under an IEEE754 standard, the mantissa bit of the floating-point number may be expanded by 1 bit, and the mantissa bit may be 11-bit. Additionally, since the mantissa bit is an unsigned number, when a Booth encoding algorithm is adopted, a high bit may be expanded by 1-bit 0 (which is to fill the high bit with 0), and therefore, a total mantissa bit may be 12-bit. When Booth encoding is performed on the corresponding element of the second vector 210, which is the multiplier, and referring to the element of the first vector 208, through a partial product generation circuit, 7 partial products may be obtained in high and low parts respectively, where a 7th partial product is 0, and a bit width of each partial product is 24 bits, and at this time, compression processing may be performed through 48 7-2 Wallace trees, and a carry from a 23rd Wallace tree to a 24th Wallace tree is 0.

(2) BF16*BF16

In this computation mode of the floating-point multiplier 206, the mantissa bit of the floating-point number is 7-bit, and considering that under the IEEE754 standard, the non-normalized and non-zero number may be expanded to be a signed number, the mantissa may be expanded to be 9-bit. When the Booth encoding is performed on the corresponding element of the second vector 210, which is the multiplier, and referring to the element of the first vector 208, through the partial product generation circuit 504, 7 effective partial products may be obtained in the high and low parts respectively, where a 6th partial product and a 7th partial product are 0, and the bit width of each partial product is 18 bits. The compression processing may be performed by using two groups of 7-2 Wallace trees, including 0th to 17th Wallace trees and 24th to 41st Wallace trees, where the carry from the 23rd Wallace tree to the 24th Wallace tree is 0.

(3) FP32*FP32

In this computation mode of the floating-point multiplier 206, the mantissa bit of the floating-point number is 23-bit, and considering the non-normalized and non-zero number under the IEEE754 standard, the mantissa may be expanded to be 24-bit. In order to save the area of a multiplication unit, the floating-point multipliers 206 of the present disclosure may be invoked twice to complete one computation in this computation mode. Therefore, a multiplication operated in the mantissa bit each time is 25 bits*13 bits, where a vector element ina of the first vector 208 is expanded by 1-bit 0 to be a 25-bit signed number, and a 24-bit mantissa of a vector element inb corresponding to the second vector 210 is divided into 12 bits in a high part and 12 bits in a low part and then the two 12 bits are expanded by 1-bit 0 to obtain two 13-bit multipliers, which are expressed as an inb_high13 in the high part and an inb_low13 in the low part. In a specific operation, the floating-point multiplier 206 of the present disclosure may be invoked to calculate an ina*inb_low13 for the first time, and the floating-point multiplier 206 may be invoked to calculate an ina*inb_high13 for the second time. In each calculation, through the Booth encoding, the 7 effective partial products may be generated, and the bit width of each partial product is 38 bits, and compressions may be performed by using 0th to 37th 7-2 Wallace trees.

(4) FP32*BF16

In this computation mode of the floating-point multiplier 206, the mantissa bit of the vector element in a of the first vector 208 is 23-bit, and the mantissa bit of the vector element inb of the second vector 210 is 7-bit, and considering that under the IEEE754 standard, the non-normalized and non-zero number may be expanded to be the signed number, the mantissas may be expanded to 25 bits and 9 bits respectively, and then a multiplication of 25 bits×9 bits may be performed, and the 7 effective partial products may be obtained, where both the 6th partial product and the 7th partial product are 0, and the bit width of each partial product is 34 bits, and the compressions may be performed by using 0th to 33rd Wallace trees.

Based on specific examples, the above describes how the floating-point multiplier 206 of the present disclosure completes operations in the first phase in the four computation modes, where the Booth encoding algorithm and the 7-2 Wallace tree are preferably used. Based on the description above, those skilled in the art may understand that in the present disclosure, by using the 7 partial products, the 7-2 Wallace tree may be reused in different computation modes.

In some computation modes, the above-mentioned mantissa processing unit 304 may further include the control circuit 406. The control circuit 406 may be used to invoke the mantissa processing unit 304 multiple times according to the computation mode when a mantissa bit width of the element of the first vector 208 and/or the corresponding element of the second vector 210 that is indicated by the computation mode is greater than a data bit width that is processable by the mantissa processing unit 304 at one time. Further, in the case of multiple invocations, the partial product summation unit may further include a shifter. If the mantissa processing unit 304 is invoked multiple times according to the computation mode, in the case of having an existing summation result, the shifter is used to shift the existing summation result and add the shifted summation result to a summation result obtained in a current invocation to obtain a new summation result and take the new summation result as a mantissa after a multiplication computation.

For example, as mentioned earlier, the mantissa processing unit 304 may be invoked twice in a computation mode of FP32*FP32. Specifically, in a first invocation of the mantissa processing unit 304, the mantissa bit (which is the ina*inb_low13) may be summed through the carry-lookahead adder in a second phase to obtain a second low-bit intermediate result, and in a second invocation of the mantissa processing unit 304, the mantissa bit (which is the ina*inb_high13) may be summed through the carry-lookahead adder in the second phase to obtain a second high-bit intermediate result. Then, in an embodiment, the second low-bit intermediate result and the second high-bit intermediate result may be accumulated by a shift operation of the shifter, so as to obtain the mantissa after the multiplication computation. The shift operation may be expressed as the following formula.

$$r_{fp32xfp32} = \mathrm{sum}_h[37:0] \ll 12 + \mathrm{sum}_l[37:0]$$

In other words, the shift operation is to shift a second high-bit intermediate result $\mathrm{sum}_h[37:0]$ to the left by 12 bits and accumulate a shifted second high-bit intermediate result with a second low-bit intermediate result $\mathrm{sum}_l[37:0]$.

In combination with FIGS. 5 to 7, the above describes operations of the floating-point multiplier 206 of the present disclosure on multiplying a mantissa of the element of the first vector 208 and a mantissa of the corresponding element of the second vector 210 when performing a vector inner product computation in detailed. Of course, in order to focus on the description of operations of the mantissa processing unit 304 of the floating-point multiplier 206 of the present disclosure, FIG. 5 does not draw and describe other units, such as the exponent processing unit 302 and the sign processing unit 306. The following will make an overall description of the floating-point multiplier 206 of the present disclosure in combination with FIG. 8. The foregoing description of the mantissa processing unit 304 also applies to a situation depicted in FIG. 8.

Figure 8:
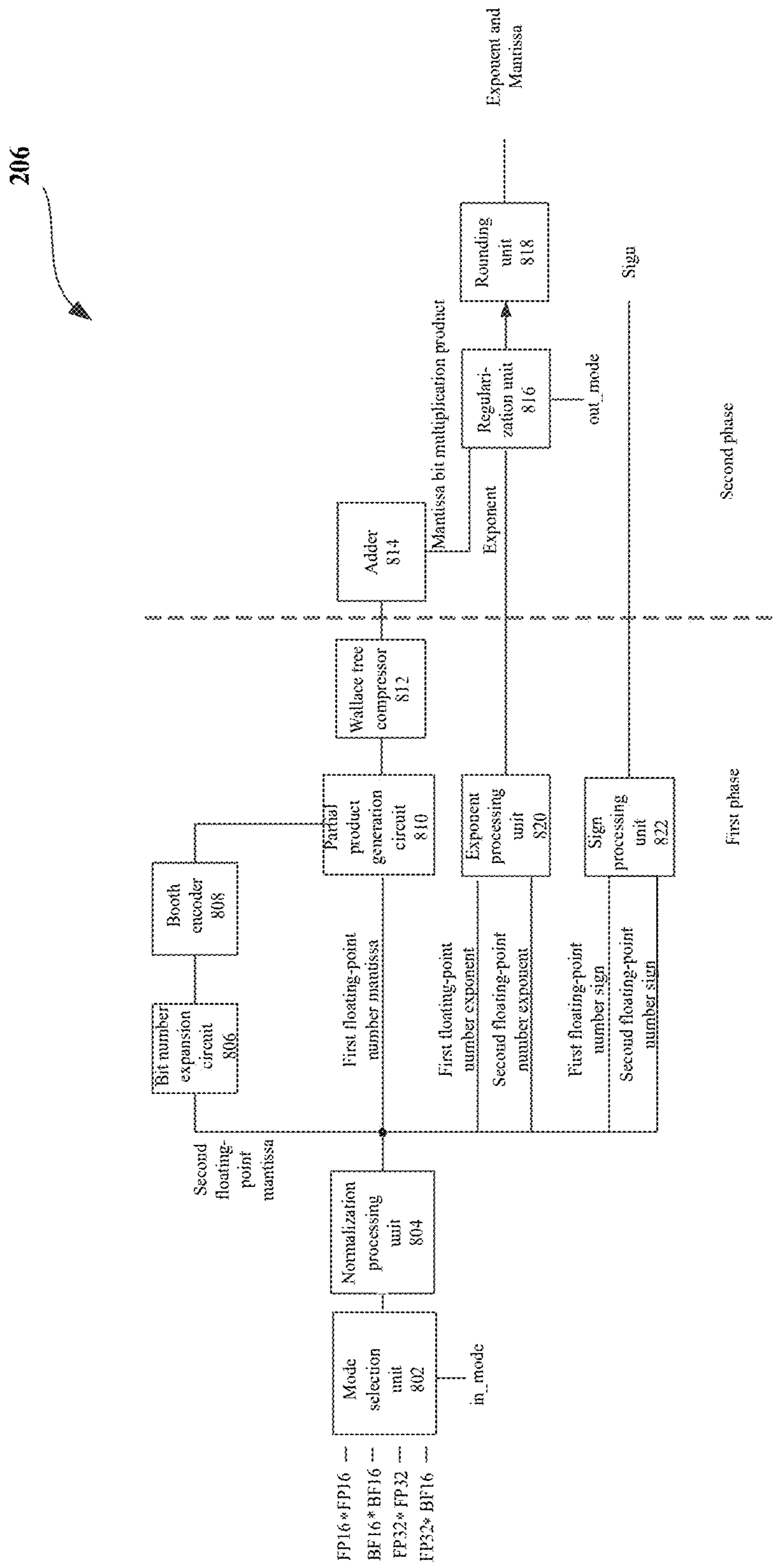
FIG. 8 is an overall schematic block diagram of a floating-point multiplier according to an embodiment of the present disclosure.

FIG. 8 is an overall schematic block diagram of a floating-point multiplier 206 according to an embodiment of the present disclosure. It should be understood that positions, existence, and connection relationships of various units depicted in figure are merely exemplary but not restrictive. For example, some of the units may be integrated, while other units may also be separated, omitted or replaced according to different application scenarios.

The floating-point multiplier 206 of the present disclosure may be exemplarily divided into a first phase and a second phase according to an operation flow in an operation of each computation mode, as shown by a dotted line in figure. In general, in the first phase: a calculation result of a sign bit may be output; an intermediate calculation result of an exponent bit may be output; and an intermediate calculation result of a mantissa bit (for example, including the aforementioned encoding process of Booth algorithm and the aforementioned Wallace tree compression process for input mantissa bit fixed-point multiplications) may be output. In the second phase: regularization and rounding operations may be performed on an exponent and a mantissa, so as to output a calculation result of the exponent and a calculation result of the mantissa.

As shown in FIG. 8, the floating-point multiplier 206 of the present disclosure may include a mode selection unit 802 and a normalization processing unit 804, where the mode selection unit 802 may select a computation mode according to an input mode signal (in_mode). In an embodiment, input mode signals may correspond to computation mode serial numbers in Table 2. For example, if the input mode signal indicates a computation mode serial number "1" in Table 2, the floating-point multiplier 206 may work in a computation mode of FP16*FP16, however if the input mode signal indicates a computation mode serial number "3" in Table 2, the floating-point multiplier 206 may work in a computation mode of FP32*FP32. For a purpose of illustration, FIG. 8 only shows four exemplary computation modes, including FP16*FP16, BF16*BF16, FP32*FP32, and FP32*BF16. However, as mentioned earlier, the floating-point multiplier 206 of the present disclosure similarly support various other computation modes.

The normalization processing unit 804 may be configured to perform normalization processing on the element of the first vector 208 or the corresponding element of the second vector 210 according to the computation mode when the element of the first vector 208 or the corresponding element of the second vector 210 are non-normalized and non-zero floating-point numbers, so as to obtain corresponding exponents and corresponding mantissas. For example, according to an IEEE754 standard, regularization processing may be performed on a floating-point number with a data format indicated by the computation mode.

Further, the floating-point multiplier 206 may include a mantissa processing unit, which is used to multiply a mantissa of the element of the first vector 208 and a mantissa of the corresponding element the second vector 210. Therefore, in one or more embodiments, the mantissa processing unit may include a bit number expansion circuit 806, a Booth encoder 808, a partial product generation circuit 810, a Wallace tree compressor 812, and an adder 814, where the bit number expansion circuit 806 may be used to expand a mantissa in consideration of a non-normalized and non-zero number under the IEEE754 standard, so as to make the mantissa suitable for an operation of the Booth encoder. Regarding the Booth encoder 808, the partial product generation circuit 810, the Wallace tree compressor 812, and the adder 814, descriptions have been made in detail in combination with FIGS. 5 to 7, which are not repeated here.

In some embodiments, the floating-point multiplier 206 of the present disclosure may further include a regularization unit 816 and a rounding unit 818. The regularization unit 816 and the rounding unit 818 have the same functions as units shown in FIG. 4. Specifically, for the regularization unit 816, the regularization unit 816 may perform floating-point number regularization processing on a summation result and exponent data from an exponent processing unit 820 according to a data format indicated by an output mode signal "out_mode" shown in FIG. 8, so as to obtain a regularized exponent result and a regularized mantissa result. For example, according to the data format indicated by the output mode signal, the regularization unit 816 may adjust a bit width of the exponent and a bit width of the mantissa to make the bit width of the exponent and the bit width of the mantissa meet requirements of the data format indicated above. For another example, if the most significant bit of the mantissa is 0 and the mantissa is not 0, the regularization unit 816 may shift the mantissa to the left by 1 bit repeatedly and make the exponent subtract 1 until the value of the most significant bit is 1. For the rounding unit 818, in an embodiment, the rounding unit 818 may perform a rounding operation on the regularized mantissa result according to a rounding mode to obtain a mantissa after rounding and take the mantissa after rounding as a mantissa after a multiplication computation.

In one or more embodiments, the above-mentioned output mode signal "out_mode" may be a part of the computation mode and may be used to indicate a data format after a multiplication computation. For example, as described in Table 3 above, if the computation mode serial number is "12", a number "1" thereof may be regarded as the "in_mode" signal described above, which is used to indicate that a multiplication operation of FP16*FP16 is performed, and a number "2" thereof may be regarded as the "out_mode" signal, which is used to indicate that a data type of an output result is BF16. Therefore, it may be understood that in some application scenarios, the output mode signal may be merged with the input mode signal described above, so as to be provided to the mode selection unit 802. Based on the merged mode signal, the mode selection unit 802 may determine data formats of both input data and the output result in an initial operation phase of the floating-point multiplier 206, and the mode selection unit 802 is not required to specially provide the output mode signal for regularization, thereby further simplifying operations.

In one or more embodiments, for the aforementioned rounding operation, the following five rounding modes may be exemplarily included.

(1) Rounding to the closest value: in this mode, if two values are equally close, an even number takes precedence. At this time, a result may be rounded to the closest and representable value, but if there are two numbers that are equally close, the even number thereof may be used as a rounding result (which is a number ending with 0 in binary).

(2) Rounding up and rounding down: an exemplary operation may be presented with reference to the examples below.

(3) Rounding towards +∞: in this rule, the result may be rounded towards a positive infinity.

(4) Rounding towards −∞: in this rule, the result may be rounded towards a negative infinity.

(5) Rounding towards 0: in this rule, the result may be rounded towards 0.

For examples of mantissa rounding in the "rounding up and rounding down" mode: for example, if two 24-bit mantissas are multiplied, a 48-bit (47-0) mantissa may be obtained, and after the normalization processing, only 46th to 24th bits are taken while outputting. If the 23th bit of the mantissa is 0, (23-0) bits may be rounded; if the 23th bit of the mantissa is 1, a 24th bit may carry 1 and the (23-0) bits may be rounded.

Figure 9:
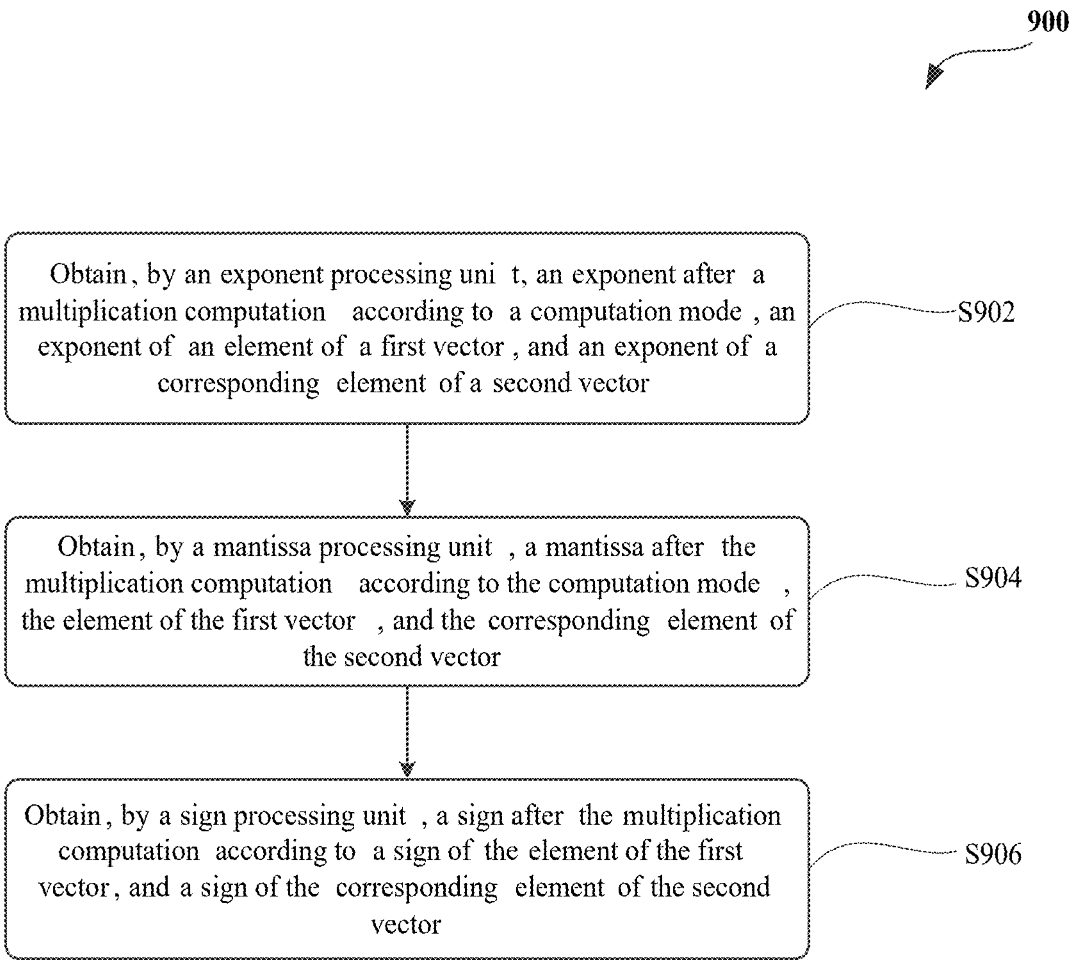
FIG. 9 is a flowchart of a method for performing a floating-point number multiplication computation by using a floating-point multiplier according to an embodiment of the present disclosure.

Returning to FIG. 8, the floating-point multiplier 206 of the present disclosure may further include the exponent processing unit 820 and a sign processing unit 822. FIG. 9 is a flowchart of a method 900 for performing a floating-point number multiplication computation by using a floating-point multiplier 206 according to an embodiment of the present disclosure.

As shown in FIG. 9, the method 900 may include, in a step S902, obtaining, by using the exponent processing unit 820, an exponent after the multiplication computation according to a computation mode, an exponent of the element of the first vector 208, and an exponent of the corresponding element of the second vector 210. As described earlier, the computation mode may be one of a plurality of types of computation modes and may be used to indicate a data format of a floating-point number. In one or more embodiments, the computation mode may further be used to determine a data format of a floating-point number of an output result. For example, the exponent processing unit 820 may sum exponent bit data of the element of the first vector 208 and an offset of an input floating-point data type corresponding to the element of the first vector 208, and sum exponent bit data of the corresponding element of the second vector 210 and an offset of an input floating-point data type corresponding to the corresponding element of the second vector 210, and then subtract offsets of output floating-point data types, so as to obtain exponent bit data of a multiplication product of the element of the first vector 208 and the corresponding element of the second vector 210. In one or more embodiments, the exponent processing unit 820 may be implemented as or include an addition and subtraction circuit (in other words, the exponent processing unit 820 may be implemented by the addition and subtraction circuit), and the exponent processing unit 820 may be used to obtain the exponent after the multiplication computation according to the computation mode, the exponent of the element of the first vector 208 and the exponent of the corresponding element the second vector 210.

Then, in a step S904, the method 900 may include obtaining, by using the mantissa processing unit, a mantissa after the multiplication computation according to the computation mode, the element of the first vector 208, and the corresponding element of the second vector 210. Regarding exemplarily operations of a mantissa, the present disclosure uses a Booth encoding algorithm and a Wallace tree compressor in some preferred embodiments, thereby improving processing efficiency of the mantissa.

Additionally, if both the element of the first vector 208 and the corresponding element of the second vector 210 are signed numbers, the method 900 may include, in a step S906, obtaining, by using the sign processing unit 822, a sign after the multiplication computation according to a sign of the element of the first vector 208 and a sign of the corresponding element of the second vector 210. The sign processing unit 822, in an embodiment, may be implemented as an exclusive OR circuit (in other words, the sign processing unit 822 may be implemented in the form of the exclusive OR circuit). The sign processing unit 822 may be used to perform an exclusive OR operation on sign bit data of the element of the first vector 208 and sign bit data of the corresponding element of the second vector 210 to obtain sign bit data of the multiplication product of the element of the first vector 208 and the corresponding element of the second vector 210.

The above gives an overall detailed description of the computing apparatus of the present disclosure in combination with FIGS. 2 to 9. Based on the above description, those skilled in the art may understand that the computing apparatus of the present disclosure supports operations in a plurality of types of computation modes, thereby overcoming the defect that existing technologies only support a multiplier for a single floating-point-type computation. Further, since the computing apparatus of the present disclosure may be reused, floating-point-type data with a high bit width may be supported, which may reduce computation costs and overheads. In one or more embodiments, the computing apparatus of the present disclosure may be placed on or included in an integrated circuit chip, so as to perform multiplication computations on floating-point numbers in the plurality of types of computation modes.

Figure 10:
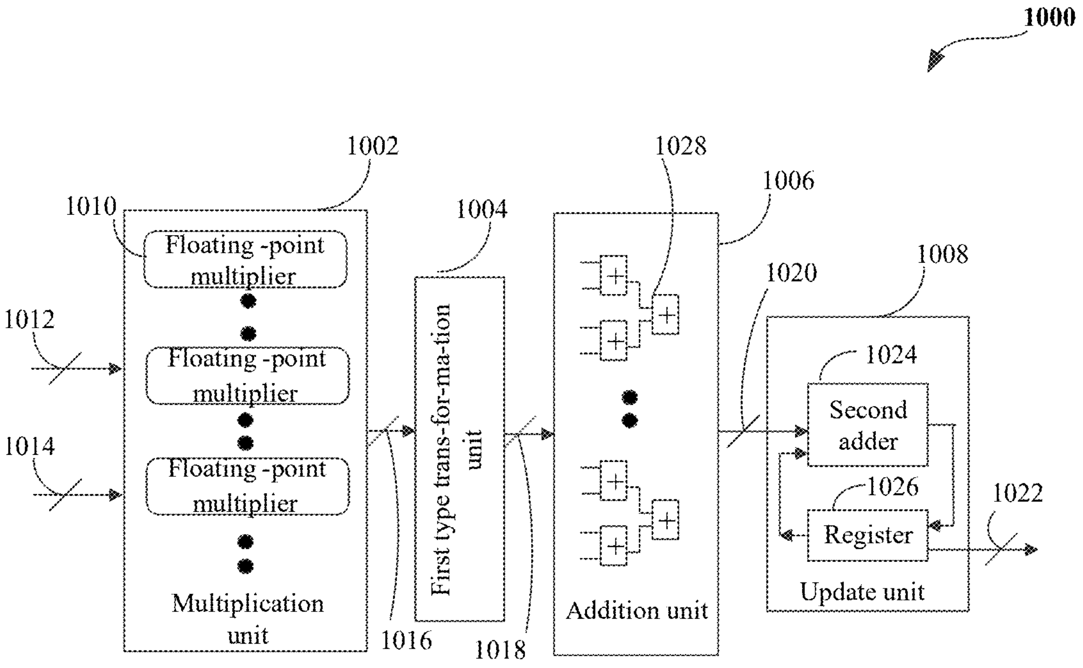
FIG. 10 is a schematic structural diagram of a computing apparatus according to a second embodiment of the present disclosure.

Another embodiment of the vector inner product computing apparatus of the present disclosure is shown in FIG. 10. A computing apparatus 1000 may include a multiplication unit 1002, a first type transformation unit 1004, an addition unit 1006, and an update unit 1008. The multiplication unit 1002, including at least one floating-point multiplier 1010, may be configured to multiply an element of a first vector 1012 received and a corresponding element of a second vector 1014 received to obtain a product result 1016 of each pair of corresponding vector elements. In this embodiment, an operation mode of the multiplication unit 1002 may be the same as that of the multiplication unit 202 in FIG. 2, which is not repeated here.

The first type transformation unit 1004 may be used to perform a data type transformation on the product result 1016, so as to output a product result 1018 that is transformed into the addition unit 1006 for an addition operation. In some embodiments, since a type of an output (such as the product result 1016) of the multiplication unit 1002 may be inconsistent with an input type that is acceptable by the addition unit 1006, the first type transformation unit 1004 is required to perform a type transformation. For example, if the product result 1016 is an FP16-type floating-point number and the addition unit 1006 supports FP32-type floating-point numbers, the first type transformation unit 1004 may exemplarily perform the following operations on FP16-type data to transform the FP16-type data into FP32-type data.

S1: shift a sign bit to the left by 16 bits; S2: add 112 to an exponent (which is a difference between a base 127 of the exponent and 15) and then shift the exponent to the left by 13 bits (right-alignment); and S3: shift a mantissa to the left by 13 bits (left-alignment).

In the above-mentioned examples, a reverse operation may be performed to transform the FP32-type data into the FP16-type data, so as to meet requirements of an adder supporting the FP16-type data. It may be understood that here, a method of data type transformation is only exemplary, and under the teaching of the present disclosure, those skilled in the art may select a suitable method or mechanism to transform the data type of the product result into a data type that is compatible with the adder.

Figure 11:
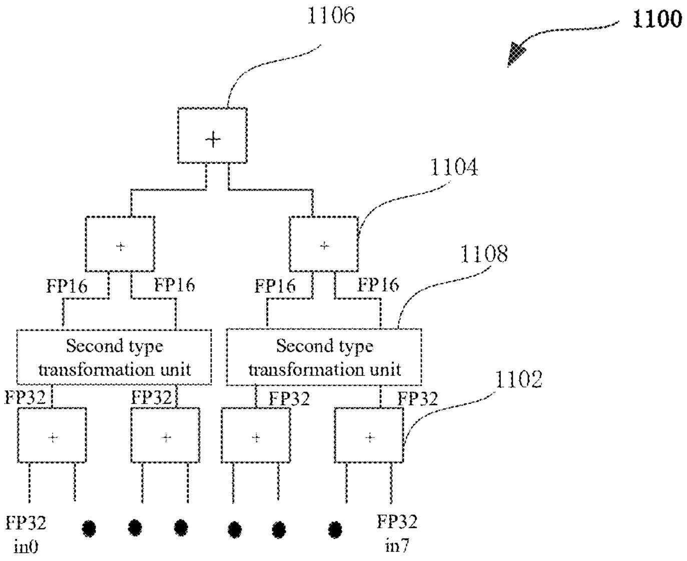
FIG. 11 is a schematic structural diagram of an addition unit according to a first embodiment of the present disclosure.

In an embodiment, the addition unit 1006 may be a first adder 1028 in a multi-level adder group arranged in a multi-level tree structure. FIG. 11 shows an implementation 1100 of a first adder 1028 by taking FP32 as an example. From the schematic content shown in the figure, it may be known that the first adder 1028 is an adder group with a three-level tree structure, where a first level includes 4 adders 1102, which exemplarily receive 8 FP32-type floating-point numbers as inputs, such as in0, in1, . . . , and in7. A second level includes 2 adders 1104, which exemplarily receive 4 FP16-type floating-point numbers as the inputs. A third level includes 1 adder 1106, which exemplarily receives 2 FP16-type floating-point numbers as the inputs and outputs a summation result of the aforementioned 8 FP32-type floating-point numbers.

In this embodiment, assuming that the 2 adders 1104 in the second level do not support an addition operation on the FP32-type floating-point numbers, therefore, according to the present disclosure, one or more second type transformation units 1108 may be set between the adders of the first level and the adders of the second level. In an embodiment, the second type transformation unit 1108 may have the same or similar functions as the first type transformation unit 1004 described in FIG. 10. In other words, the second type transformation unit 1108 may transform floating-point-type data that is input into a data type that is consistent with a subsequent addition operation. Specifically, the second type transformation unit 1108 may support one or more types of data type transformations according to different application requirements. For example, in examples shown in FIG. 11, the second type transformation unit 1108 may support a unidirectional data type transformation from FP32-type data to FP16-type data. However, in other examples, the second type transformation unit 1108 may be designed to support a bidirectional data type transformation between the FP32-type data and the FP16-type data. In other words, the second type transformation unit 1108 may support not only a data type transformation from the FP32-type data to the FP16-type data, but also a data type transformation from the FP16-type data to the FP32-type data. Additionally or optionally, the first type transformation unit 1004 or the second type transformation unit 1108 may be configured to support a bidirectional data type transformation among a plurality of types of floating-point data. For example, the first type transformation unit 1004 or the second type transformation unit 1108 may support the aforementioned bidirectional transformation between various types of floating-point data that are described in combination with computation modes, which helps the present disclosure to maintain the forward or backward compatibility of the data during a data processing process, and further expands the application scenarios and scope of the solution of the present disclosure. It is required to be emphasized that the aforementioned type transformation unit is only one optional solution of the present disclosure, and if the first adder or the second adder itself supports an addition computation on a plurality of types of data formats, or if a computation of processing the plurality of types of data formats may be reused, such type transformation unit may not be required. Additionally, if a data format that is supported by the second adder is a data format of output data of the first adder, it is also not necessary to set such type transformation unit between the first adder and the second adder.

Figure 12:
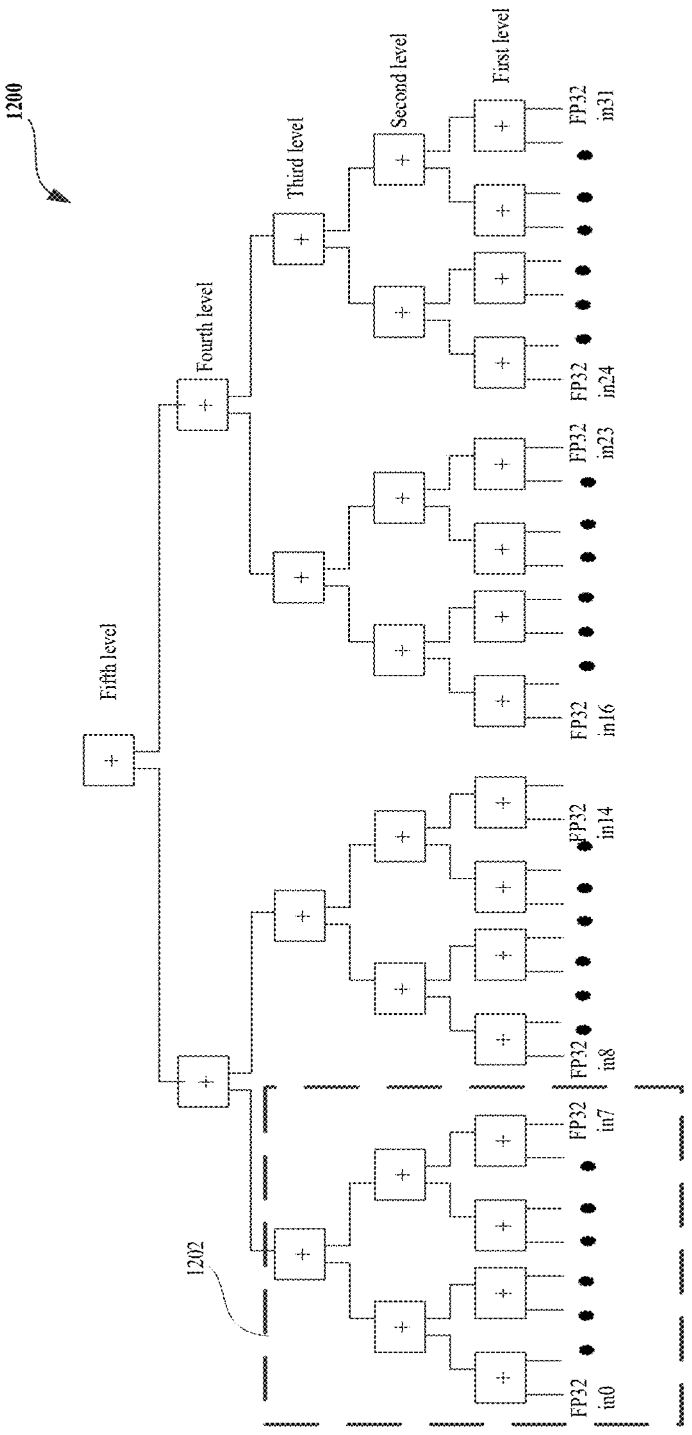
FIG. 12 is a schematic structural diagram of an addition unit according to a second embodiment of the present disclosure.

FIG. 12 is a schematic block diagram of another exemplary adder group 1200 of an addition unit 1006 according to an embodiment of the present disclosure. From the content of the figure, it may be known that FIG. 12 exemplarily shows an adder group with a five-level tree structure, which specifically includes 16 adders of a first level, 8 adders of a second level, 4 adders of a third level, 2 adders of a fourth level, and 1 adder of a fifth level. From the multi-level tree structure, it may be known that the adder group 1200 shown in FIG. 12 may be regarded as an expansion of the tree structure shown in FIG. 11. Or conversely, the adder group 1100 shown in FIG. 11 may be regarded as a part of or a constitutional unit of the adder group 1200 shown in FIG. 12, such as a part framed by a dashed line 1202 in FIG. 12.

In operations, the 16 adders in the first group may receive the product result 1018 from the first type transformation unit 1004. Optionally, if a data type of the aforementioned product result 1016 is the same as a data type supported by the adders of the first level of the adder group 1200 of the addition unit 1006, the product result 1016 may be directly input into the adder group 1200 without passing through the first type transformation unit 1004, such as 32 FP32-type floating-point numbers shown in FIG. 12 (such as in0-in31). After addition operations of the 16 adders of the first level, 16 summation results may be obtained as inputs of the 8 adders of the second level. By analogy, finally, summation results that are used as outputs of the 2 adders of the fourth level may be input into the 1 adder of the fifth level, and an output of the 1 adder of the fifth level may be used as an intermediate result 1020 of FIG. 10 to be input into a second adder 1024 located at an update unit 1008. According to different application scenarios, the intermediate result 1020 may go through one of the following operations.

If the intermediate result 1020 is the intermediate result 1020 obtained during a first round of invocation of the multiplication unit 1002, the intermediate result 1020 may be input into the second adder 1024 of the aforementioned update unit 1008 and then cached in a register 1026 of the update unit 1008 to wait for being added to the intermediate result 1020 obtained in a second round of invocation; or if the intermediate result 1020 is a result obtained during an intermediate round (for example, when more than two rounds of operations are performed), the intermediate result 1020 may be input into the second adder 1024 and then added to a summation result obtained in a previous round of addition operation that is input into the second adder 1024 from the register 1026, so as to be a summation result of the intermediate round of addition operation to be stored in the register 1026; or if the intermediate result 1020 is the intermediate result 1020 obtained during a final round of invocation of the multiplication unit 1002, the intermediate result 1020 may be input into the second adder 1024 and then added to the summation result obtained in the previous round of addition operation that is input into the second adder 1024 from the register 1026, so as to be a final result 1022 of this vector inner product computation.

Considering that the first adder 1028 of the aforementioned addition unit 1006 may be a floating-point adder that supports a plurality of types of modes, accordingly, the second adder 1024 in the update unit 1008 may have the same or similar properties; in other words, the second adder 1024 in the update unit 1008 may also support a floating-point number addition operation with the plurality of types of modes. However, if the first adder 1028 or the second adder 1024 does not support an addition computation with a plurality of types of floating-point data formats, the present disclosure further discloses the first type transformation unit or the second type transformation unit, which may be used to perform a transformation between data types or formats, thereby similarly enabling the first adder or the second adder to be used to perform an addition on floating-point numbers of a plurality of types of computation modes. Although in FIG. 12, a plurality of adders are placed in the form of a tree hierarchy to complete an addition operation on a plurality of numbers, this is not limited in the solution of the present disclosure. Under the teaching of the present disclosure, those skilled in the art may arrange the plurality of adders in other suitable structures or methods, for example, through connecting a plurality of full adders, half adders or other types of adders serially or in parallel to implement an addition operation on a plurality of floating-point numbers that are input. Additionally, for the sake of brevity, the second type transformation unit 1108 shown in FIG. 11 is not shown in an addition tree structure shown in FIG. 12. However, according to application requirements, those skilled in the art may set one or more inter-level type transformation units in the multi-level adder shown in FIG. 12 to implement a data type transformation between different levels and further expand the scope of application of the computing apparatus of the present disclosure.

Figure 13:
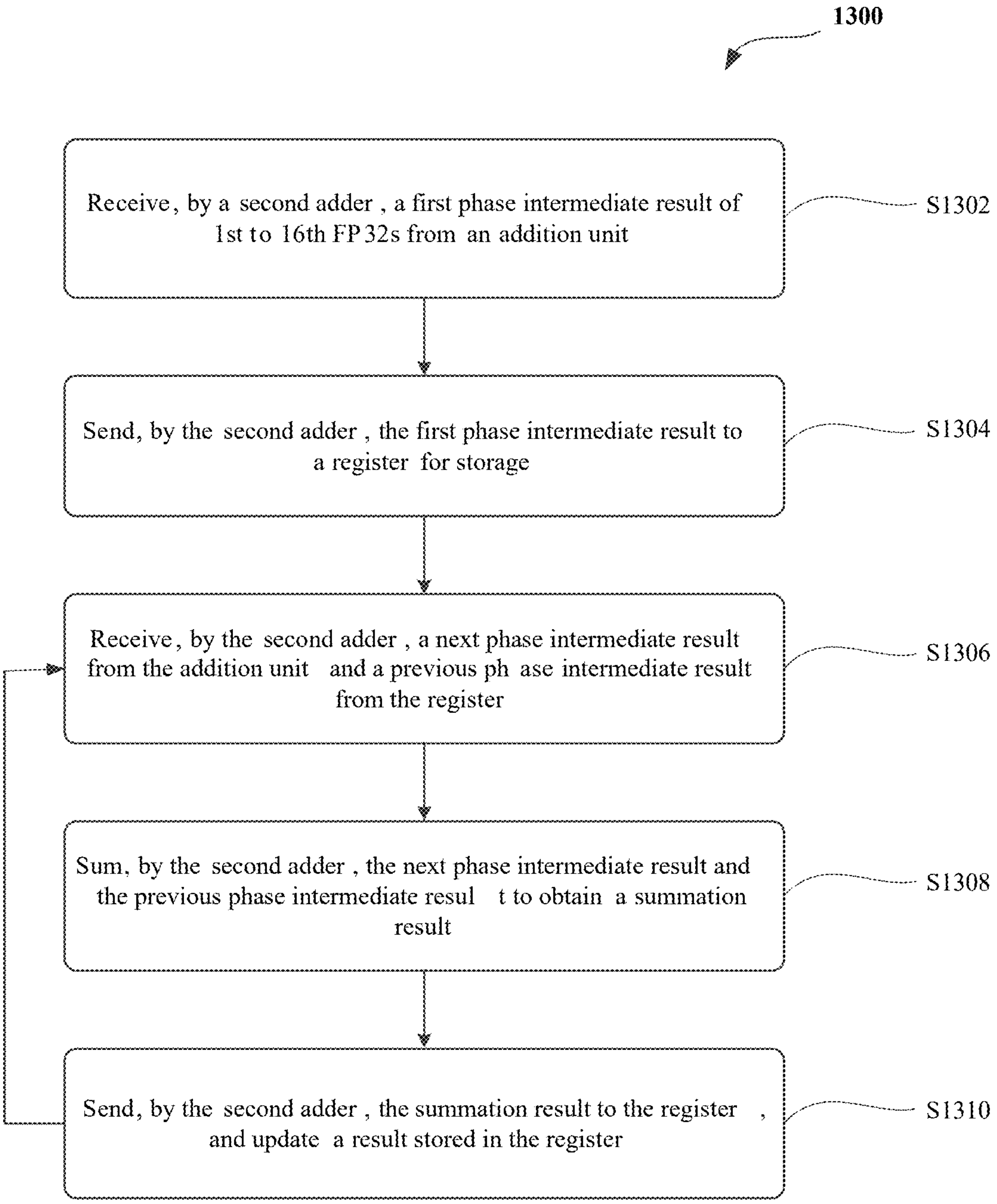
FIG. 13 is an operation flowchart of an update unit according to an embodiment of the present disclosure.

FIG. 13 further shows an operation process 1300 of an update unit 1008. In order to explain more clearly, here, it is assumed that the multiplication unit 1002 of FIG. 10 has a total of 16 multipliers 1010, and the first vector 1012 has 64 FP32s, and the second vector 1014 also has 64 FP32s. Since there are 16 multipliers 1010, batch processing may be performed in units of 16 FP32s. For example, the multiplication unit 1002 may receive 1st to 16th FP32s of both the first vector 1012 and the second vector 1014 first, and then after processing of the first type transformation unit 1004 and the addition unit 1006, the FP32s may be output to the update unit 1008.

In a step S1302, the second adder 1024 receives a first phase intermediate result of the 1st to 16th FP32s from the addition unit 1006. In a step S1304, the second adder 1024 sends the first phase intermediate result to the register 1026 for storage. When the update unit 1008 executes the step S1302 and the step S1304, the multiplication unit 1002 receives 17th to 32nd FP32s of both the first vector 1012 and the second vector 1014, and then after the processing of the first type transformation unit 1004 and the addition unit 1006, in a step S1306, the second adder 1024 receives a next phase intermediate result from the addition unit 1006 (such as a second phase intermediate result of the 17th to 32nd FP32s) and a previous phase (such as the first phase) intermediate result from the register 1026. In a step S1308, the second adder 1024 sums the next phase intermediate result and the previous phase intermediate result, such as summing the second phase intermediate result and the first phase intermediate result, so as to obtain a summation result. In a step S1310, the second adder 1024 sends the summation result to the register 1026 and updates a result that is stored in the register 1026. Later, the step S1306, the step S1308 and the step S1310 may be repeatedly executed until all addition operations on the 64 FP32s are completed.

In an embodiment, the multiplication unit 1002, the first type transformation unit 1004, the addition unit 1006, and the update unit 1008 may be operated independently and in parallel. For example, after outputting the product result 1016, the multiplication unit 1002 receives a next pair of corresponding elements for a multiplication operation without waiting for a next unit (such as the first type transformation unit 1004, the addition unit 1006 and the update unit 1008) to finish running. Similarly, after outputting the product result 1018 that is transformed, the first type transformation unit 1004 receives a next product result 1016 for a type transformation operation; after outputting the intermediate result 1020, the addition unit 1006 receives a next product result 1018 that is transformed from the first type transformation unit 1004 for an addition operation. In some embodiments, the type of a vector is not required to be transformed, and the first type transformation unit 1004 may not be set in the computing apparatus 1000. Those skilled in the art may easily deduce how units/modules of various levels are operated in parallel without the first type transformation unit 1004, which therefore is not repeated here.

Figure 14:
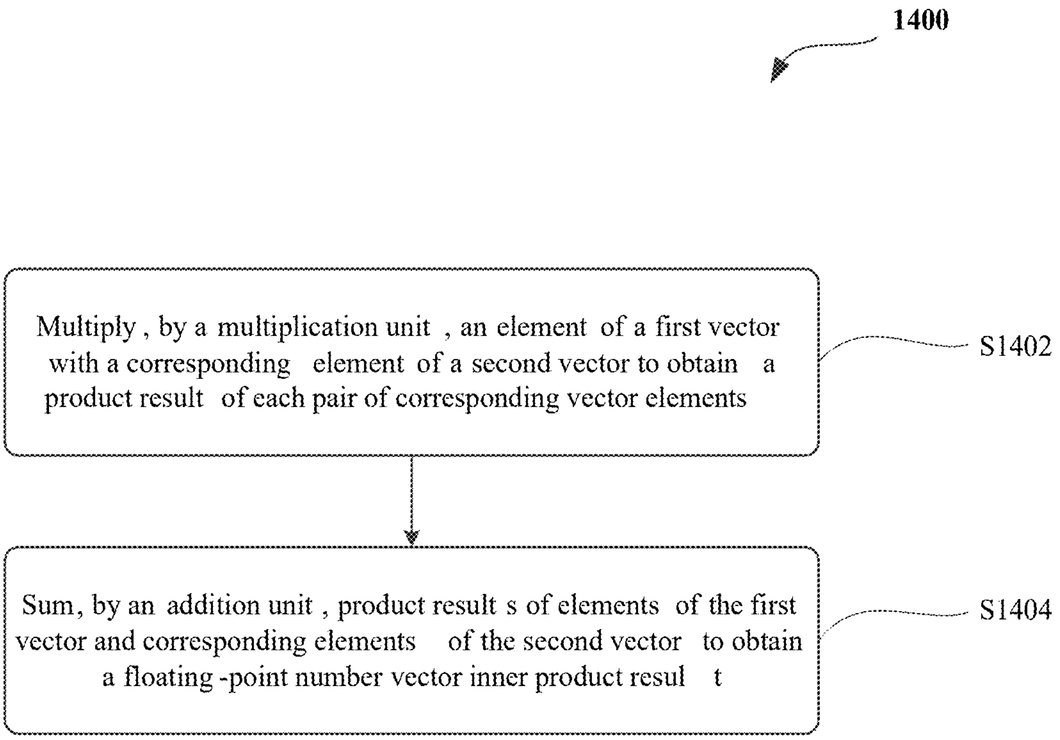
FIG. 14 is a flowchart of performing a vector inner product computation by using a computing apparatus according to an embodiment of the present disclosure.

FIG. 14 is a flowchart of a method 1400 for performing a vector inner product computation by using a computing apparatus according to an embodiment of the present disclosure. It may be understood that here, the aforementioned computing apparatus may be the computing apparatus of FIG. 2 or FIG. 10.

The computing apparatus of FIG. 2 may be taken as an example. In a step S1402, the multiplication unit 202 may be used to multiply the element of the first vector 208 and the corresponding element of the second vector 210 to obtain the product result 212 of each pair of corresponding vector elements; in a step S1404, the addition unit 204 may be used to sum product results of elements of the first vector 208 and corresponding elements of the second vector 210 to obtain the floating-point number vector inner product result 216. Although the above is not shown in FIG. 14, as described earlier, in some embodiments, if a bit width of a vector or an element of the vector that are input exceeds a bit width of an input port of the computing apparatus, the method may be executed cyclically.

Although the above method shows using the computing apparatus of the present disclosure to perform the floating-point vector inner product computation in the form of steps, the order of these steps does not mean that steps of the method must be executed in a stated order, but these steps may be executed in other orders or in parallel. Additionally, here, for the sake of concise description, other steps of the present disclosure are not described, but those skilled in the art may understand from the content of the present disclosure that according to the method, the computing apparatus may also be used to perform various operations described in combination with drawings.

In the above-mentioned embodiments of the present disclosure, the description of each embodiment has its own emphasis. A part that is not described in detail in one embodiment may be described with reference to related descriptions in other embodiments. Each technical feature of the embodiments above may be randomly combined. For the sake of conciseness, not all possible combinations of technical features of the embodiments above are described. Yet, provided that there is no contradiction, combinations of these technical features shall fall within the scope of the description of the present specification.

Figure 15:
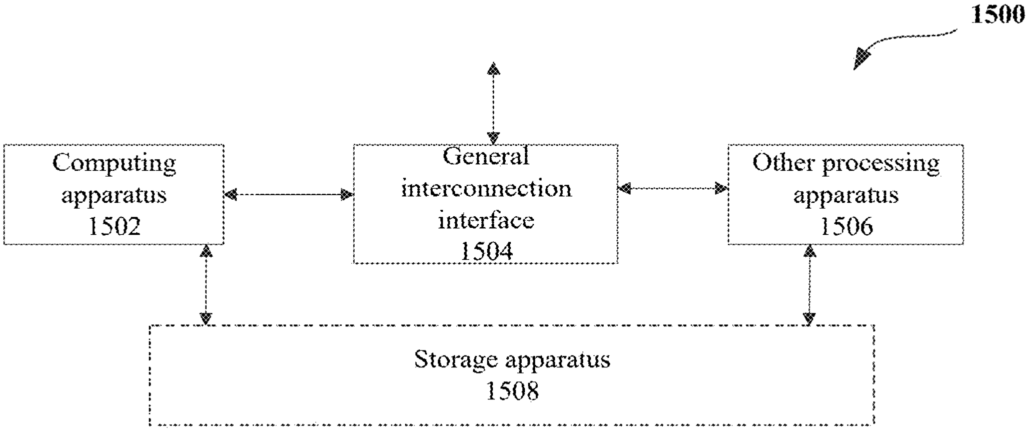
FIG. 15 is a schematic structural diagram of a combined processing apparatus according to an embodiment of the present disclosure.

FIG. 15 is a structural diagram of a combined processing apparatus 1500 according to an embodiment of the present disclosure. As shown in the figure, the combined processing apparatus 1500 may include a computing apparatus 1502, where the computing apparatus 1502 may be the computing apparatus of FIG. 2 or FIG. 10. Additionally, the combined processing apparatus 1500 may further include a general interconnection interface 1504 and other processing apparatus 1506. The computing apparatus of the present disclosure interacts with other processing apparatus to jointly complete operations specified by users.

According to a solution of the present disclosure, other processing apparatus 1506 may include one or more of general-purpose and/or special-purpose processors such as a central processing unit (CPU), a graphics processing unit (GPU), an artificial intelligence processor, and the like, and the number of the processors is not limited but determined according to actual requirements. In one or more embodiments, other processing apparatus 1506 may serve as an interface that connects the computing apparatus 1502 (which may be embodied as an artificial intelligence computing apparatus) of the present disclosure to external data and control and perform operations which include but are not limited to data moving, and complete basic controls such as starting and stopping a machine learning computing apparatus. Other processing apparatus may also cooperate with the machine learning computing apparatus to complete computation tasks.

According to the solution of the present disclosure, the general interconnection interface 1504 may be used to transfer data and control instructions between the computing apparatus 1502 and other processing apparatus 1506. For example, the computing apparatus 1502 may obtain input data that is required from other processing apparatus 1506 via the general interconnection interface 1504 and write the input data to an on-chip storage apparatus of the computing apparatus 1502. Further, the computing apparatus 1502 may obtain the control instructions from other processing apparatus 1506 via the general interconnection interface 1504 and write the control instructions to an on-chip control caching unit of the computing apparatus 1502. Alternatively or optionally, the general interconnection interface 1504 may further read data in a storage unit of the computing apparatus 1502 and then transfer the data to other processing apparatus 1506.

Optionally, the combined processing apparatus 1500 may further include a storage apparatus 1508, which may be connected to the computing apparatus 1502 and other processing apparatus 1506 respectively. In one or more embodiments, the storage apparatus 1508 may be used to store data of the computing apparatus 1502 and data of other processing apparatus 1506, and the storage apparatus 1508 is especially suitable for storing data whose data that is required for the computation may not be entirely stored in an internal memory of the computing apparatus 1502 or other processing apparatus 1506.

According to different application scenarios, the combined processing apparatus 1500 may be used as a system on chip (SOC) of a device including a mobile phone, a robot, a drone, a video-capture device, a video surveillance device, and the like, which may effectively reduce a core area of a control part, improve processing speed, and reduce overall power consumption. In this situation, the general interconnection interface 1504 of the combined processing apparatus 1500 may be connected to some components of a device. The components here may include a camera, a monitor, a mouse, a keyboard, a network card, or a WIFI interface.

In some embodiments, the present disclosure provides a chip or an integrated circuit chip, including the combined processing apparatus 1500. In some other embodiments, the present disclosure provides a chip package structure, including the chip above.

In some embodiments, the present disclosure provides a board card, including the chip package structure above. Referring to FIG. 16, FIG. 16 shows an exemplary board card 1600. In addition to including the aforementioned chip 1602, the aforementioned board card 1600 may further include other supporting components, which include but are not limited to: a storage component 1604, an interface apparatus 1606, and a control component 1608.

The storage component 1604 is connected to the chip 1602 in the chip package structure via a bus, and the storage component 1604 is used for storing data. The storage component 1604 may include a plurality of groups of storage units 1610. Each group of the storage units 1610 is connected to the chip 1602 via the bus. It may be understood that each group of storage units 1610 may be a double data rate (DDR) synchronous dynamic random access memory (SDRAM).

The DDR may double the speed of the SDRAM without increasing clock frequency. The DDR allows data to be read on rising and falling edges of a clock pulse. The speed of the DDR is twice that of a standard SDRAM. In an embodiment, the storage component 1604 may include 4 groups of the storage units 1610. Each group of the storage units 1610 may include a plurality of DDR4 particles (chips). In an embodiment, four 72-bit DDR4 controllers are included in the chip 1602, where for a 72-bit DDR4 controller, 64 bits are used for data transfer, and 8 bits are used for an error checking and correcting (ECC) parity.

In an embodiment, each group of the storage units 1610 may include a plurality of DDR SDRAMs arranged in parallel. The DDR may transfer data twice per clock cycle. A controller for controlling the DDR is arranged in the chip 1602 to control data transfer and data storage of each group of the storage units 1610.

The interface apparatus 1606 is electrically connected to the chip 1602 in the chip package structure. The interface apparatus 1606 is configured to implement data transfer between the chip 1602 and an external device 1612 (such as a server or a computer). For example, in an embodiment, the interface apparatus 1606 may be a standard peripheral component interconnect express (PCIe) interface. For example, data to be processed is transferred from the server to the chip 1602 through the standard PCIe interface to realize the data transfer. In another embodiment, the interface apparatus 1606 may also be other interfaces. Specific representations of other interfaces are not limited in the present disclosure as long as an interface unit may realize a switching function. Additionally, a calculation result of the chip 1602 is still sent back to the external device (such as the server) by the interface apparatus 1606.

The control component 1608 is electrically connected to the chip 1602, so as to monitor a state of the chip 1602. Specifically, the chip 1602 may be electrically connected to the control component 1608 through a serial peripheral interface (SPI). The control component 1608 may include a micro controller unit (MCU). For example, the chip 1602 may include a plurality of processing chips, a plurality of processing cores, or a plurality of processing circuits, and may drive a plurality of loads. Therefore, the chip 1602 may be in different working states, such as a multi-load state and a light-load state. Through the control component 1608, regulation and control of the working states of the plurality of processing chips, the plurality of processing cores, and/or the plurality of processing circuits in the chip 1602 may be implemented.

In some embodiments, the present disclosure provides an electronic device or apparatus, including the aforementioned board card 1600. According to different application scenarios, the electronic device or apparatus may include a data processing apparatus, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device. The vehicle may include an airplane, a ship, and/or a car; the household appliance may include a television, an air conditioner, a microwave oven, a refrigerator, an electric rice cooker, a humidifier, a washing machine, an electric lamp, a gas cooker, and a range hood; and the medical device may include a nuclear magnetic resonance spectrometer, a B-ultrasonic scanner, and/or an electrocardiograph.

It should be explained that for the sake of conciseness, the foregoing method embodiments are all described as a series of combinations of actions, but those skilled in the art should know that the present disclosure is not limited by the described order of action since the steps may be performed in a different order or simultaneously according to the present disclosure. Secondly, those skilled in the art should also understand that the embodiments described in the specification are all optional, and actions and modules involved are not necessarily required for the present disclosure.

In the embodiments above, the description of each embodiment has its own emphasis. For a part that is not described in detail in one embodiment, reference may be made to related descriptions in other embodiments.

In several embodiments of the present disclosure, it should be understood that the disclosed apparatus may be implemented in other ways. For instance, the apparatus embodiments above are merely exemplary. For instance, a division of units is only a logical function division. In an actual implementation, there may be other manners for the division. For instance, a plurality of units or components may be combined or integrated in another system, or some features may be ignored or not performed. In addition, the displayed or discussed mutual coupling or direct coupling or communication connection may be indirect coupling or communication connection of some interfaces, devices or units, and may be in electrical, optical, acoustic, magnetic or other forms.

The units described as separate components may or may not be physically separated. The components shown as units may or may not be physical units. In other words, the components may be located in one place, or may be distributed to a plurality of network units. According to actual requirements, some or all of the units may be selected for achieving purposes of the embodiments of the present disclosure.

Additionally, functional units in each embodiment of the present application may be integrated into one processing unit, or each of the units may exist separately and physically, or two or more units may be integrated into one unit. The integrated units above may be implemented in the form of hardware or in the form of a software program module.

If the integrated units are implemented in the form of the software program module and sold or used as an independent product, the integrated units may be stored in a computer-readable memory. Based on such understanding, if a technical solution of the present disclosure may be embodied in the form of a software product, the software product may be stored in a memory, and the software product may include several instructions to be used to enable a computer device (which may be a personal computer, a server, or a network device, and the like) to perform all or part of steps of the method of the embodiments of the present disclosure. The foregoing memory may include: an USB flash drive, a read-only memory (ROM), a random access memory (RAM), a mobile hard disk, a magnetic disk, or an optical disc, and other media that may store program codes.

The foregoing may be better understood according to the following articles:

Article A1. A computing apparatus for performing a vector inner product computation, comprising: a multiplication unit, including one or more floating-point multipliers, where the floating-point multiplier(s) is configured to multiply an element of a first vector received with a corresponding element of a second vector received to obtain a product result of each pair of corresponding vector elements, where the first vector includes one or more elements and the second vector includes one or more elements; and an addition unit configured to sum product results of elements of the first vector and corresponding elements of the second vector to obtain a summation result.

Article A2. The computing apparatus of article A1, further comprising: an update unit configured to, in response to a case that the summation result is an intermediate result of the vector inner product computation, perform multiple addition operations on a plurality of intermediate results that are generated to output a final result of the vector inner product computation.

Article A3. The computing apparatus of article A1 or article A2, where the update unit includes a second adder and a register, where the second adder is configured to perform the following operations repeatedly until addition operations of all the plurality of intermediate results are completed: receiving an intermediate result from the addition unit and a previous summation result from the register and a previous addition operation; summing the intermediate result and the previous summation result to obtain a summation result of a present addition operation; and updating a previous summation result stored in the register by using the summation result of the present addition operation.

Article A4. The computing apparatus of article A1, where after outputting the product result, the multiplication unit receives a next pair of corresponding elements for a multiplication operation; and after outputting the summation result, the addition unit receives a next product result from the multiplication unit for an addition operation.

Article A5. The computing apparatus of any one of articles A1-A4, further comprising: a first type transformation unit configured to perform a data type transformation on the product results to enable the addition unit to perform the addition operation.

Article A6. The computing apparatus of any one of articles A1-A5, where the addition unit includes a multi-level adder group arranged in a multi-level tree structure, where each level of the adder group includes one or more first adders.

Article A7. The computing apparatus of any one of articles A1-A6, further comprising: one or more second type transformation units placed in the multi-level adder group, where the second type transformation unit(s) is configured to transform data output by one level of the adder group into another type of data for an addition operation of a next level of the adder group.

Article A8. The computing apparatus of any one of articles A1-A7, where the floating-point multiplier is used to perform a floating-point number multiplication computation according to a computation mode, where the element of the first vector at least includes an exponent and a mantissa and the corresponding element of the second vector at least includes the exponent and the mantissa, and the floating-point multiplier includes: an exponent processing unit configured to obtain an exponent after the multiplication computation according to the computation mode, an exponent of the element of the first vector, and an exponent of the corresponding element of the second vector; and a mantissa processing unit configured to obtain a mantissa after the multiplication computation according to the computation mode, the element of the first vector, and the corresponding element of the second vector, where the computation mode is used to indicate a data format of the element of the first vector and a data format of the corresponding element of the second vector.

Article A9. The computing apparatus of article A8, where the computation mode is further used to indicate a data format after the multiplication computation.

Article A10. The computing apparatus of article A8, where the data format includes at least one of a half precision floating-point number, a single precision floating-point number, a brain floating-point number, a double precision floating-point number, and a self definition floating-point number.

Article A11. The computing apparatus of article A8, where the element of the first vector further includes a sign and the corresponding element of the second vector further includes the sign, and the floating-point multiplier further includes: a sign processing unit configured to obtain a sign after the multiplication computation according to a sign of the element of the first vector and a sign of the corresponding element of the second vector.

Article A12. The computing apparatus of article A11, where the sign processing unit includes an exclusive OR logic circuit, where the exclusive OR logic circuit is configured to perform an exclusive OR computation according to the sign of the element of the first vector and the sign of the corresponding element of the second vector, so as to obtain the sign after the multiplication computation.

Article A13. The computing apparatus of article A8, further comprising: a normalization processing unit configured to, when the element of the first vector and the corresponding element of the second vector are non-normalized and non-zero floating-point numbers, perform normalization processing on the element of the first vector and the corresponding element of the second vector according to the computation mode to obtain corresponding exponents and corresponding mantissas.

Article A14. The computing apparatus of article A8, where the mantissa processing unit includes a partial product computation unit and a partial product summation unit, where the partial product computation unit is configured to obtain intermediate results according to mantissas of the elements of the first vector and mantissas of the corresponding elements of the second vector, and the partial product summation unit is configured to sum the intermediate results to obtain the summation result and take the summation result as the mantissa after the multiplication computation.

Article A15. The computing apparatus of article A14, where the partial product computation unit includes a Booth encoding circuit, where the Booth encoding circuit is configured to fill high and low bits of the mantissas of the elements of the first vector or the mantissas of the corresponding elements of the second vector with 0 and perform Booth encoding processing, so as to obtain the intermediate results.

Article A16. The computing apparatus of article A15, where the partial product summation unit includes an adder, where the adder is configured to sum the intermediate results to obtain the summation result.

Article A17. The computing apparatus of article A15, where the partial product summation unit includes a Wallace tree and an adder, where the Wallace tree is configured to sum the intermediate results to obtain second intermediate results, and the adder is configured to sum the second intermediate results to obtain the summation result.

Article A18. The computing apparatus of any one of articles A16-A17, where the adder includes at least one of a full adder, a serial adder, and a carry-lookahead adder.

Article A19. The computing apparatus of article A17, where, when the number of the intermediate results is less than M, a zero value is added as the intermediate results to make the number of the intermediate results equal to M, where M is a preset positive integer.

Article A20. The computing apparatus of article A19, where each Wallace tree has M inputs and N outputs, and the number of Wallace trees is not less than K, where N is a preset positive integer that is less than M, and K is a positive integer that is not less than the biggest bit width of the intermediate results.

Article A21. The computing apparatus of article A20, where the partial product summation unit is configured to select one or more groups of Wallace trees to sum the intermediate results according to the computation mode, where each group of Wallace trees has X Wallace trees, and X is the number of bits of the intermediate results, where there is a sequential carry relationship between Wallace trees within each group, but there is no carry relationship between Wallace trees between each group.

Article A22. The computing apparatus of any one of articles A19-A21, where the mantissa processing unit further includes a control circuit, which is configured to, when a computation unit indicates that a mantissa bit width of at least one of the element of the first vector or the corresponding element of the second vector is greater than a data bit width that is processable by the mantissa processing unit at one time, invoke the mantissa processing unit multiple times according to the computation mode.

Article A23. The computing apparatus of article A22, where the partial product summation unit further includes a shifter, where when the control circuit invokes the mantissa processing unit multiple times according to the computation mode, the shifter is configured to shift an existing summation result in each invocation and add the shifted summation result to a summation result obtained in a current invocation to obtain a new summation result and take a new summation result obtained in a final invocation as the mantissa after the multiplication computation.

Article A24. The computing apparatus of article A23, further comprising: a regularization unit configured to: perform floating-point number regularization processing on the mantissa after the multiplication computation and the exponent after the multiplication computation to obtain a regularized exponent result and a regularized mantissa result and take the regularized exponent result as the exponent after the multiplication computation and take the regularized mantissa result as the mantissa after the multiplication computation.

Article A25. The computing apparatus of article A24, further comprising: a rounding unit configured to perform a rounding operation on the regularized mantissa result according to a rounding mode to obtain a mantissa after rounding and take the mantissa after rounding as the mantissa after the multiplication computation.

Article A26. The computing apparatus of article A8, further comprising: a mode selection unit configured to select a computation mode that indicates the data format of the element of the first vector and the data format of the corresponding element of the second vector from a plurality of types of computation modes supported by the floating-point multiplier.

Article A27. A method for performing a vector inner product computation by using the computing apparatus of any one of articles A1-A26, comprising: multiplying, by a floating-point multiplier, an element of a first vector with a corresponding element of a second vector to obtain a product result of each pair of corresponding vector elements; and summing product results of elements of the first vector and corresponding elements of the second vector to obtain a summation result.

Article A28. An integrated circuit chip, including the computing apparatus of any one of articles A1-A26.

Article A29. An integrated circuit apparatus, including the computing apparatus of any one of articles A1-A26.

It should be understood that terms such as “first”, “second”, “third”, and “fourth” appear in the claims, specification, and drawings are used for distinguishing different objects rather than describing a specific order. It should be understood that terms “including” and “comprising” used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that terms used in the specification of the present disclosure are merely intended to describe specific embodiments rather than to limit the present disclosure. As being used in the specification and the claims of the disclosure, unless the context clearly indicates otherwise, singular forms such as “a”, “an”, and “the” are intended to include plural forms. It should also be understood that a term "and/or" used in the specification and the claims refers to any and all possible combinations of one or more of relevant listed items and includes these combinations.

As being used in this specification and the claims, a term "if" may be interpreted as "when", or "once" or "in response to a determination" or "in response to a case where something is detected" depending on the context. Similarly, depending on the context, a clause "if it is determined that" or a clause "if [a described condition or event] is detected" may be interpreted as "once it is determined that", or "in response to a determination", or "once [a described condition or event] is detected", or "in response to a case where [a described condition or event] is detected".

The embodiments of the present disclosure have been described in detail above. Specific examples have been used in the specification to explain principles and implementations of the present disclosure. The descriptions of the embodiments above are only used to facilitate understanding of the method and core ideas of the present disclosure. Persons of ordinary skill in the art may change or transform the specific implementation and application scope of the present disclosure according to the ideas of the present disclosure. The changes and transformations shall all fall within the protection scope of the present disclosure. In summary, the content of this specification should not be construed as a limitation on the present disclosure.

What is claimed:

1. A computing apparatus for performing a vector inner product computation, comprising:

a memory configured to store computer-executable instructions of a multiplication unit, an addition unit, and an update unit; and one or more processors configured to execute the computer-executable instructions, wherein the multiplication unit is configured to receive a plurality of first vectors and a plurality of second vectors to output a plurality of product results, and the multiplication unit includes a plurality of floating-point multipliers, wherein each floating-point multiplier is configured to receive a first vector and a corresponding second vector, each first vector includes a plurality of first vector elements, each second vector includes a plurality of second vector elements, each first vector element includes a sign, an exponent, and a mantissa, and each second vector element includes a sign, an exponent, and a mantissa, and wherein each floating-point multiplier is configured to multiply a first vector element with a corresponding second vector element to output the product result of the first vector element and the corresponding second vector element;

wherein the addition unit is configured to receive the plurality of product results from the multiplication unit and sum the plurality of product results to output a summation result, wherein the addition unit includes a multi-level adder group arranged in a multi-level tree structure, wherein the computing apparatus is configured to transform data output by one level of the multi-level adder group from a first floating-point data format into a second floating-point data format different from the first floating-point data format for an addition operation of a next level of the multi-level adder group, and wherein the transformation of the data includes shifting a sign bit of the data, adjusting an exponent of the data based on a difference between exponent bases of the first floating-point data format and the second floating-point data format, shifting the exponent of the data, and shifting a mantissa of the data; and wherein the update unit is configured to receive the summation result from the addition unit and, in response to a case that the summation result is an intermediate result of the vector inner product computation, perform multiple addition operations on a plurality of intermediate results that are generated to output a final result of the vector inner product computation, wherein the update unit includes a second adder and a register, and wherein the second adder is configured to perform the following operations repeatedly until the addition operations of all the plurality of intermediate results are completed:

receiving the intermediate result from the addition unit and a previous summation result obtained in a previous addition operation from the register;

summing the intermediate result and the previous summation result to obtain a summation result of a present addition operation; and updating a previous summation result stored in the register by using the summation result of the present addition operation.

2. The computing apparatus of claim 1, wherein after outputting the product result, the multiplication unit receives a next pair of corresponding vector elements for a multiplication operation; and after outputting the summation result, the addition unit receives a next product result from the multiplication unit for an addition operation.

3. The computing apparatus of claim 1, wherein the computing apparatus is configured to perform a data type transformation on product results to enable the addition unit to perform an addition operation.

4. The computing apparatus of claim 3, wherein each level of the multi-level adder group includes one or more first adders.

5. The computing apparatus of claim 1, wherein the floating-point multiplier is used to perform a floating-point number multiplication computation according to a computation mode, the computing apparatus is configured to obtain an exponent result after the floating-point number multiplication computation according to the computation mode, the exponent of the first vector element, and the exponent of the corresponding second vector element, the computing apparatus is configured to obtain a mantissa result after the floating-point number multiplication computation according to the computation mode, the mantissa of the first vector element, and the mantissa of the corresponding second vector element, and the computation mode is used to indicate a data format of the first vector element and a data format of the corresponding second vector element.

6. The computing apparatus of claim 5, wherein the computation mode is further used to indicate a data format after the floating-point number multiplication computation.

7. The computing apparatus of claim 5, wherein the data format comprises at least one of: a half precision floating-point number, a single precision floating-point number, a brain floating-point number, a double precision floating-point number, or a self-definition floating-point number.

8. The computing apparatus of claim 5, wherein the floating-point multiplier further includes:

a sign processing unit configured to obtain a sign result after the floating-point number multiplication computation according to the sign of the first vector element and the sign of the corresponding second vector element.

9. The computing apparatus of claim 8, wherein the sign processing unit includes an exclusive OR logic circuit, wherein the exclusive OR logic circuit is configured to perform an exclusive OR computation according to the sign of the first vector element and the sign of the corresponding second vector element, so as to obtain the sign result after the floating-point number multiplication computation.

10. The computing apparatus of claim 5, wherein the computing apparatus is configured to, when the first vector element and the corresponding second vector element are non-normalized and non-zero floating-point numbers, perform normalization processing on the first vector element and the corresponding second vector element according to the computation mode to obtain corresponding exponents and corresponding mantissas.

11. The computing apparatus of claim 5, wherein the computing apparatus includes a partial product computation unit and a partial product summation unit, wherein the partial product computation unit is configured to obtain intermediate results according to mantissas of the first vector elements and mantissas of the corresponding second vector elements, and the partial product summation unit is configured to sum the intermediate results to obtain the summation result and take the summation result as the mantissa result after the floating-point number multiplication computation.

12. The computing apparatus of claim 11, wherein the partial product computation unit includes a Booth encoding circuit, wherein the Booth encoding circuit is configured to fill high and low bits of the mantissas of the first vector elements or the mantissas of the corresponding second vector elements with 0 and perform Booth encoding processing, so as to obtain the intermediate results.

13. The computing apparatus of claim 12, wherein the partial product summation unit includes a third adder, wherein the third adder is configured to sum the intermediate results to obtain the summation result.

14. The computing apparatus of claim 13, wherein the third adder comprises at least one of: a full adder, a serial adder, or a carry-lookahead adder.

15. The computing apparatus of claim 12, wherein the partial product summation unit includes a Wallace tree and a fourth adder, wherein the Wallace tree is configured to sum the intermediate results to obtain second intermediate results, and the fourth adder is configured to sum the second intermediate results to obtain the summation result.

16. The computing apparatus of claim 15, wherein, when the number of the intermediate results is less than M, a zero value is added as the intermediate results to make the number of the intermediate results equal to M, wherein M is a preset positive integer.

17. The computing apparatus of claim 16, wherein each Wallace tree has M inputs and N outputs, and the number of Wallace trees is not less than K, wherein N is a preset positive integer that is less than M, and K is a positive integer that is not less than the biggest bit width of the intermediate results.

* * * * *